(12) United States Patent
Staudt et al.

(10) Patent No.: US 10,279,668 B2
(45) Date of Patent: May 7, 2019

(54) RECREATIONAL VEHICLE ROOFTOP SHADE SYSTEM

(71) Applicants: Robert Joseph Staudt, La Vernia, TX (US); Brian Joseph Staudt, La Vernia, TX (US)

(72) Inventors: Robert Joseph Staudt, La Vernia, TX (US); Brian Joseph Staudt, La Vernia, TX (US)

( * ) Notice: Subject to any disclaimer, the term of this patent is extended or adjusted under 35 U.S.C. 154(b) by 0 days.

(21) Appl. No.: 15/367,024

(22) Filed: Dec. 1, 2016

(65) Prior Publication Data

US 2017/0144525 A1    May 25, 2017

Related U.S. Application Data

(63) Continuation-in-part of application No. 14/024,471, filed on Sep. 11, 2013, now Pat. No. 9,533,557.

(51) Int. Cl.
*B60J 11/04* (2006.01)

(52) U.S. Cl.
CPC .................................... *B60J 11/04* (2013.01)

(58) Field of Classification Search
CPC ............ B60J 11/04; B60J 11/00; B63B 17/02
USPC ....... 160/368.1, 370.21; 150/166; 135/88.01, 135/88.07; 296/100.11, 100.12, 100.13, 296/100.15, 100.16, 100.18, 136.1, 296/136.11
See application file for complete search history.

(56) References Cited

U.S. PATENT DOCUMENTS

| | | | |
|---|---|---|---|
| 1,616,126 A * | 2/1927 | Jacobson | B60J 11/00 135/121 |
| 2,571,362 A | 10/1951 | Hervey | |
| 2,646,097 A | 7/1953 | Gaverth et al. | |
| 2,751,977 A | 6/1956 | Pinkerton | |
| 2,801,667 A | 8/1957 | Curran | |
| 2,811,728 A * | 11/1957 | Litsheim | B63B 17/02 114/361 |
| 2,948,288 A | 8/1960 | Nelson | |
| 3,806,185 A * | 4/1974 | Brandjord | B60J 7/062 296/98 |
| 4,075,723 A | 2/1978 | Bareis et al. | |
| 4,944,551 A | 7/1990 | Hardy, Jr. | |
| 5,029,933 A | 7/1991 | Gillem | |
| 5,228,408 A * | 7/1993 | Jannausch | B63B 17/02 114/361 |
| 5,806,873 A | 9/1998 | Glassman | |
| 5,850,799 A * | 12/1998 | Geisel | B63B 17/023 114/201 R |
| 6,010,176 A | 1/2000 | Jones | |

(Continued)

*Primary Examiner* — Katherine W Mitchell
*Assistant Examiner* — Abe Massad
(74) *Attorney, Agent, or Firm* — John C. Cave; Gunn, Lee & Cave, P.C.

(57) ABSTRACT

The present invention relates to a novel rooftop shading system for recreational vehicles (RVs) and a method of installing the same. The shading system comprises a sheet of material generally sized to cover the roof of an RV. The sheet is supported over the roof with support rods which extend across the width of the roof and maintain a curved shape of the sheet. The sheet is secured to the RV by two strap systems which extend from the front end and rear end of the sheet. This system allows the sheet to be secured to and elevated from the roof of the RV providing space and producing shade to the rooftop of the trailer body or RV.

26 Claims, 20 Drawing Sheets

(56) References Cited

U.S. PATENT DOCUMENTS

| | | | |
|---|---|---|---|
| 6,220,263 B1 | 4/2001 | Randmae | |
| 6,415,832 B1 | 7/2002 | Ricks | |
| 6,427,709 B1 | 8/2002 | Montes | |
| 6,505,879 B1 | 1/2003 | Arviso | |
| 6,779,827 B2 | 8/2004 | Clark | |
| 7,104,591 B1 | 9/2006 | Sanns | |
| 7,883,103 B1 | 2/2011 | Greaves, Jr. | |
| 8,365,751 B2 * | 2/2013 | Clampitt | E04H 15/001 |
| | | | 135/120.1 |
| 9,004,088 B1 | 4/2015 | Nicheporuck | |
| 9,533,557 B2 * | 1/2017 | Staudt | B60J 11/04 |
| 2005/0011547 A1 | 1/2005 | Herndon et al. | |
| 2007/0194598 A1 | 8/2007 | Perniciaro | |
| 2009/0066112 A1 * | 3/2009 | Sharapov | B60J 11/00 |
| | | | 296/136.1 |
| 2014/0007912 A1 * | 1/2014 | Waagmeester | E04H 15/06 |
| | | | 135/88.03 |
| 2015/0068692 A1 | 3/2015 | Staudt et al. | |
| 2016/0311504 A1 * | 10/2016 | Langley | B63B 17/02 |
| 2017/0144525 A1 * | 5/2017 | Staudt | B60J 11/04 |

\* cited by examiner

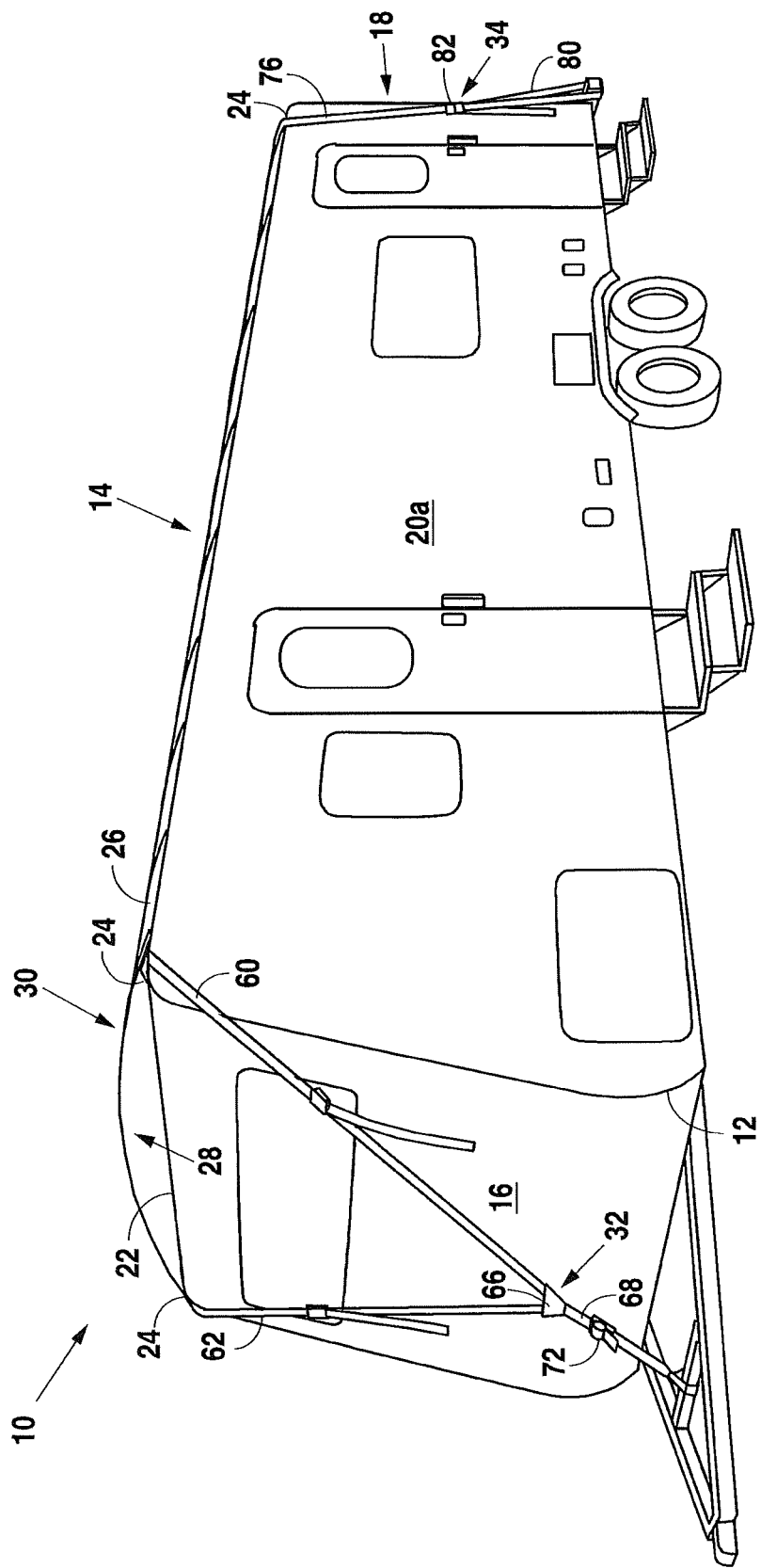

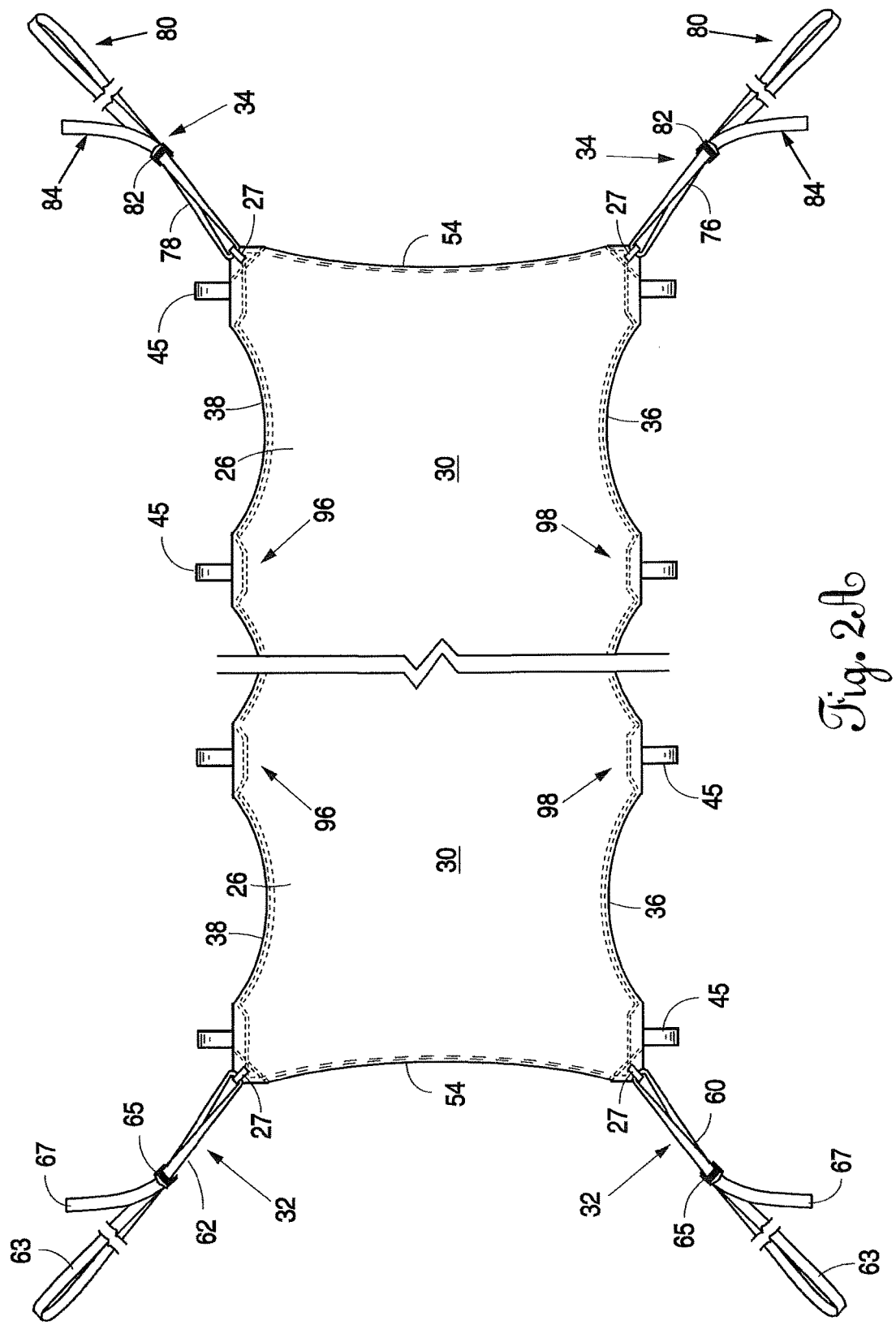

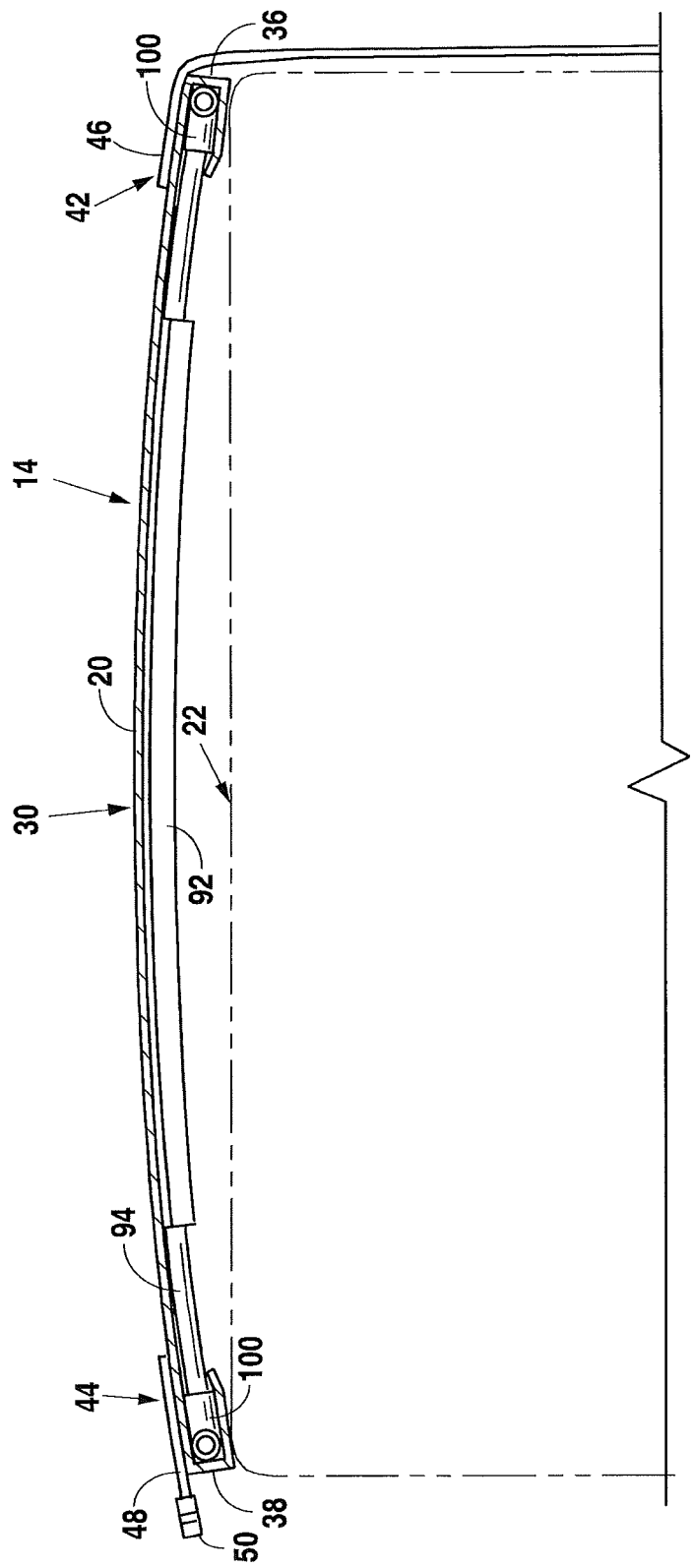

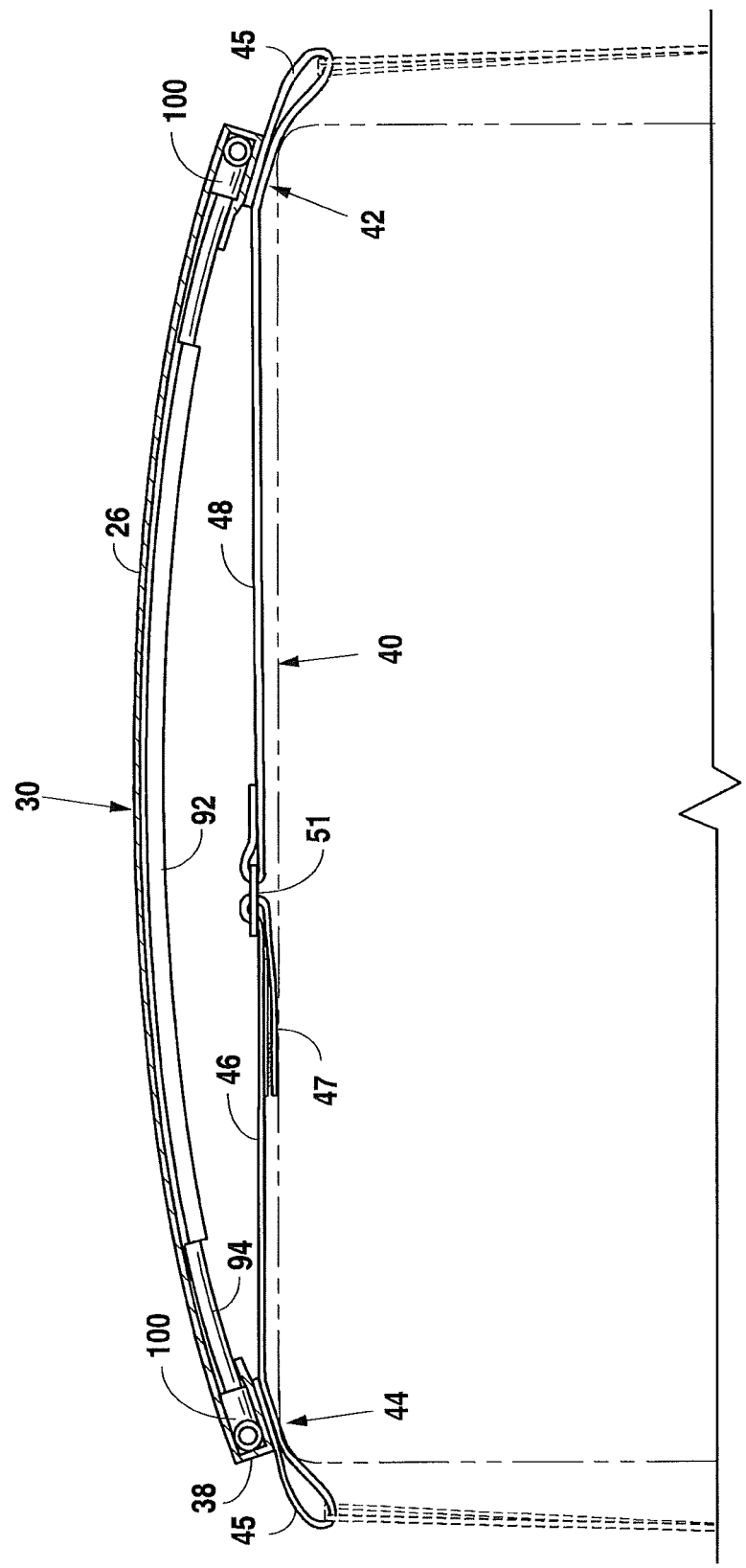

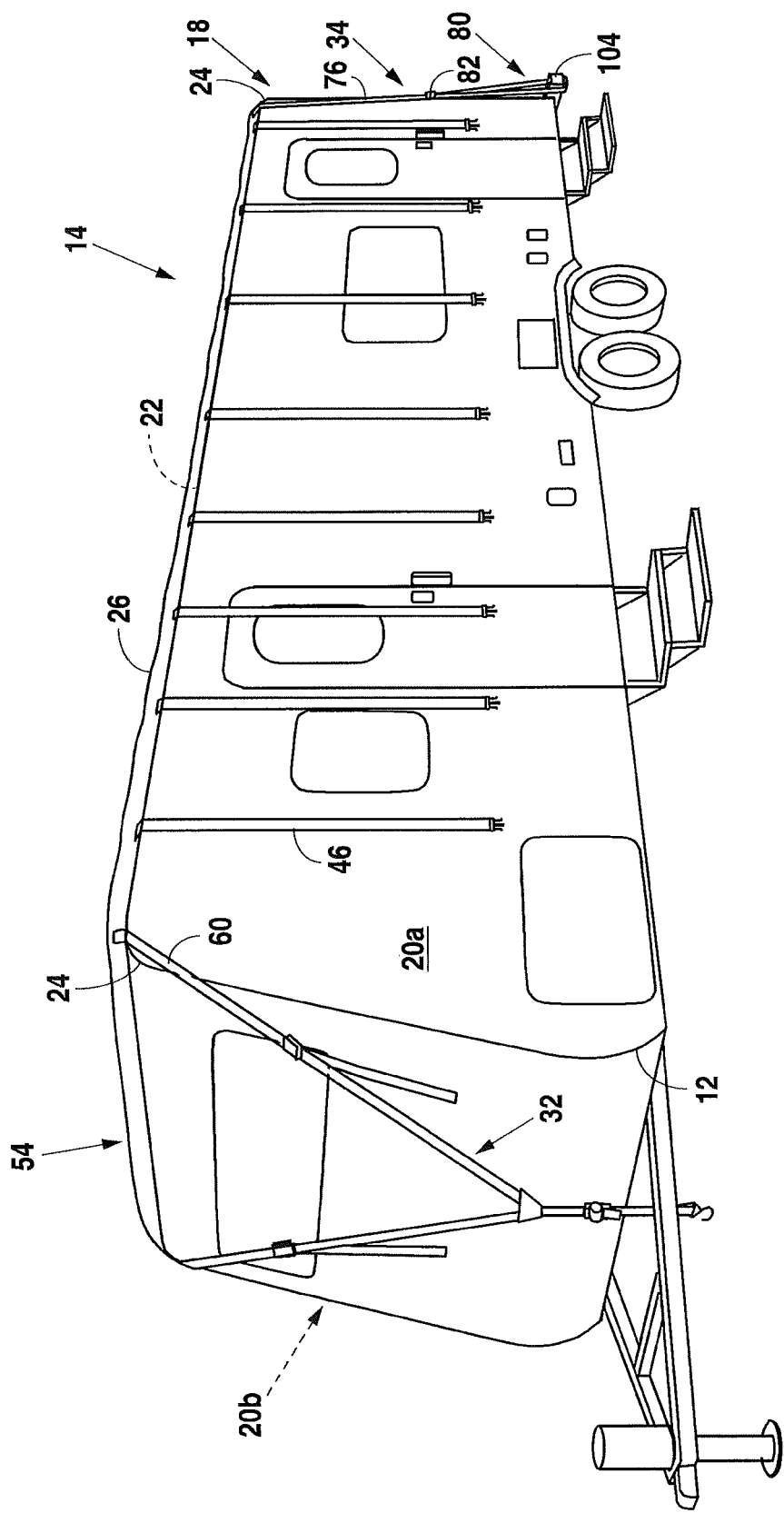

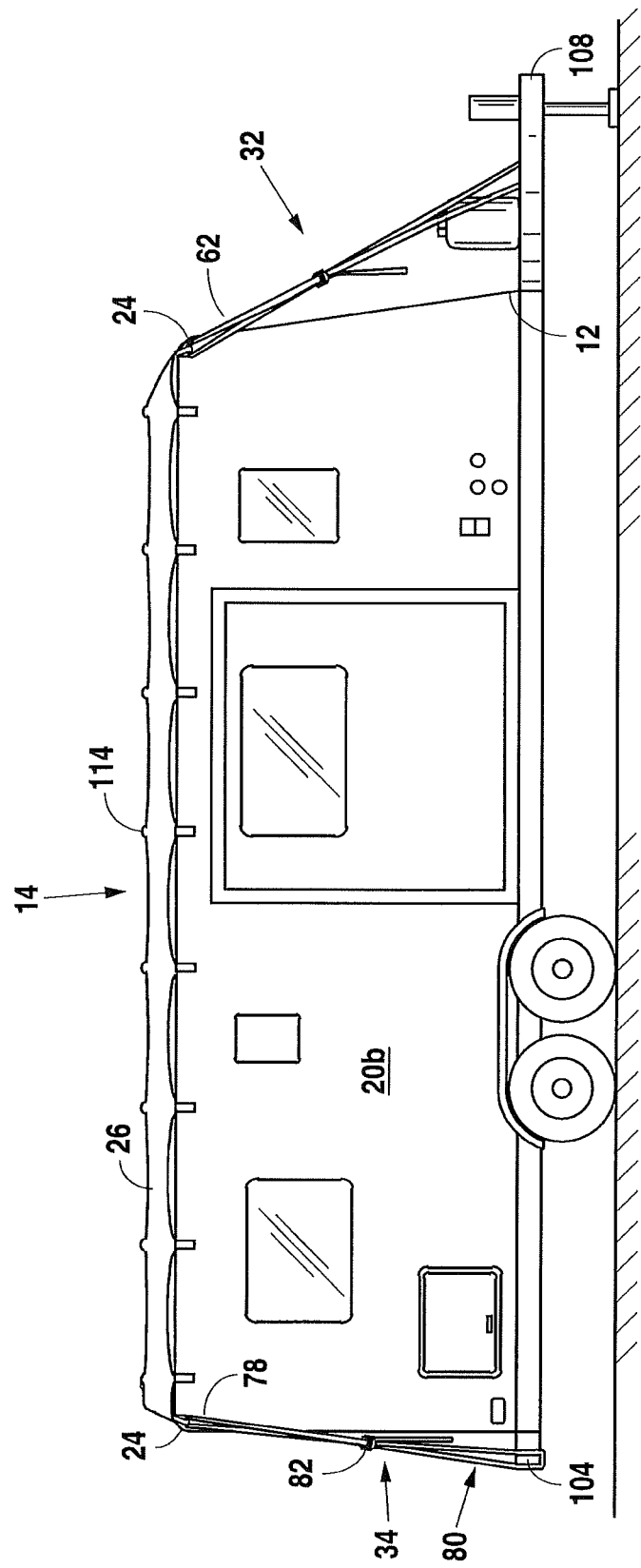

RECREATIONAL VEHICLE ROOFTOP SHADE SYSTEM

CROSS-REFERENCES TO RELATED APPLICATIONS

The instant application is a continuation in part that claims the benefit of patent application Ser. No. 14/024,471 filed Sep. 11, 2013, and allowed Aug. 22, 2016.

STATEMENT REGARDING FEDERALLY-SPONSORED RESEARCH OR DEVELOPMENT

Not applicable.

BACKGROUND OF THE INVENTION

1. Field of the Invention

The present invention relates generally to shading systems for recreational vehicles (RVs). More particularly, the present invention concerns a shade cover which can be secured to an RV and which extends over a roof of the RV to protect the roof from the sun's harmful ultraviolet rays and to provide a cooling effect for the roof.

2. Description of the Related Art

RVs give people the freedom to travel to a desired destination without having to make separate travel and accommodation arrangements. Once at a desired destination, the RV is parked for a period of time while the travelers enjoy their stay. The specific location where an RV is parked can range from rustic facilities to luxury resorts. Many times the RV will be parked at an "RV park," which is an area specifically dedicated to RV travelers and RV parking, or, the RV may simply be parked in random locations such as a beach, a national park, or any other area where RV parking is allowed.

Regardless of the specific location, once parked, the RV typically remains there for some time. The duration of stay varies and many times extends over a substantial period of time. Although some RV parks have covered stalls, the RV is usually parked in an area with limited or no shading and the RV is continually exposed to the sun during daylight hours. With the sun bearing down, the RV suffers deleterious effects such as ultraviolet (UV) degradation. Various components on the roofs are commonly made from plastic or similar materials and are particularly susceptible to the UV degradation. Additionally, the roof of the RV heats up as it is continually exposed throughout the daylight hours. Therefore, there is a need for a shade system to shield the RV roof from the sun and to provide a cooling effect while the RV remains parked.

BRIEF SUMMARY OF THE INVENTION

The present invention is directed to a rooftop shade system for RV roofs. The rooftop shade system is formed with an RV and a novel shade cover extending over the RV. The RV is accepted as the type of RV that is towed behind a vehicle. It has a trailer body with a front end, a rear end, opposing sides extending between the two ends, and a roof. A trailer tongue extends from the front end and a bumper is at the rear end. It is anticipated that this invention could be adapted to shade the roof of a drive-back motorhome.

The shade cover is a sheet of material in a generally curved shape. When in place, it has a concave lower surface that faces the roof of the trailer body and convex upper surface opposite of the lower surface. At least one support rod, and preferably a plurality of support rods, extends along the concave surface of the sheet in a direction generally lateral to the length of the roof. Each support rod is attached to the sheet at first and second rod attachment locations and may extend through a sleeve affixed to the concave surface of the sheet between the rod attachment locations. When in place, the support rods are curved and maintain the curved shape of the sheet, which allows at least a portion of the sheet to be elevated from the roof of the trailer body. Preferably, the support rods are flexible but have resilience so that when the rods are bent they will return to their unbent state unless prevented from doing so. The front, back and sides of the sheet may be inwardly scalloped to allow the edges of the sheet to be raised from the roof of the trailer body when the sheet is in place.

One or more straps are affixed to the sheet at first and second strap attachment locations and extend under the concave surface of the sheet. Preferably, the first and second strap attachment locations are on the convex upper surface of the sheet and the straps extend around side boundaries of the sheet or they may be attached to the concave lower surface. The scalloped portions of the sides of the sheet may be positioned between the strap attachment locations. Preferably, each strap is comprised of two lengths connected to each other with a buckle or similar connecting means or, the strap may be of a single overlapped cinching strap and buckle. The straps are sized so that they pull the first and second side boundaries of the sheet toward each other and, therefore, cause the support rods to have a curved bend.

A first stability strap system and a second stability strap system secure the curved sheet to the trailer so that wind does not carry it away. It has been shown that these stability straps will also hold curved sheet in place while the RV is moving. The first stability strap system has one or more strap members affixed or otherwise secured to a front end of the sheet while the second stability strap system has one or more strap members affixed or otherwise secured to the rear end of the sheet. The first stability strap system attaches to the trailer tongue and the second stability strap system attaches to the rear bumper. Preferably, the first and second stability strap systems each incorporates a ratchet connection, a cinching strap and buckle, or some other connection that enables tightening of the sheet against the rooftop as further described herein below.

BRIEF DESCRIPTION OF THE DRAWINGS

FIG. 1 is a perspective view of the preferred embodiment of the present invention secured to an RV.

FIG. 2A is a top plan view of the alternative embodiment of the shade cover of the present invention.

FIG. 5 is cross-section side view of the preferred embodiment of the shade cover on the roof of the trailer body prior to connecting the straps.

FIG. 6A is a cross-section side view of the alternative embodiment of the cover on the roof of the trailer body with the cinching strap further tightened.

FIG. 8 is a perspective view of the preferred embodiment showing the shade cover on the roof of the trailer during another stage of installation.

FIG. 10A is a side elevation view of the alternative embodiment of the present invention after installation is complete.

DETAILED DESCRIPTION OF THE INVENTION

This detailed description, generally describes two embodiments of the present invention, a preferred embodiment and an alternative embodiment. The preferred embodiment is shown in FIGS. 1-10 and the alternative embodiment is shown in FIGS. 1A-10A. Where appropriate, the applicants have used the same reference numbers for the preferred and the alternative embodiment where it identifies the same elements of the shade cover system and the trailer body.

Figure 1A:
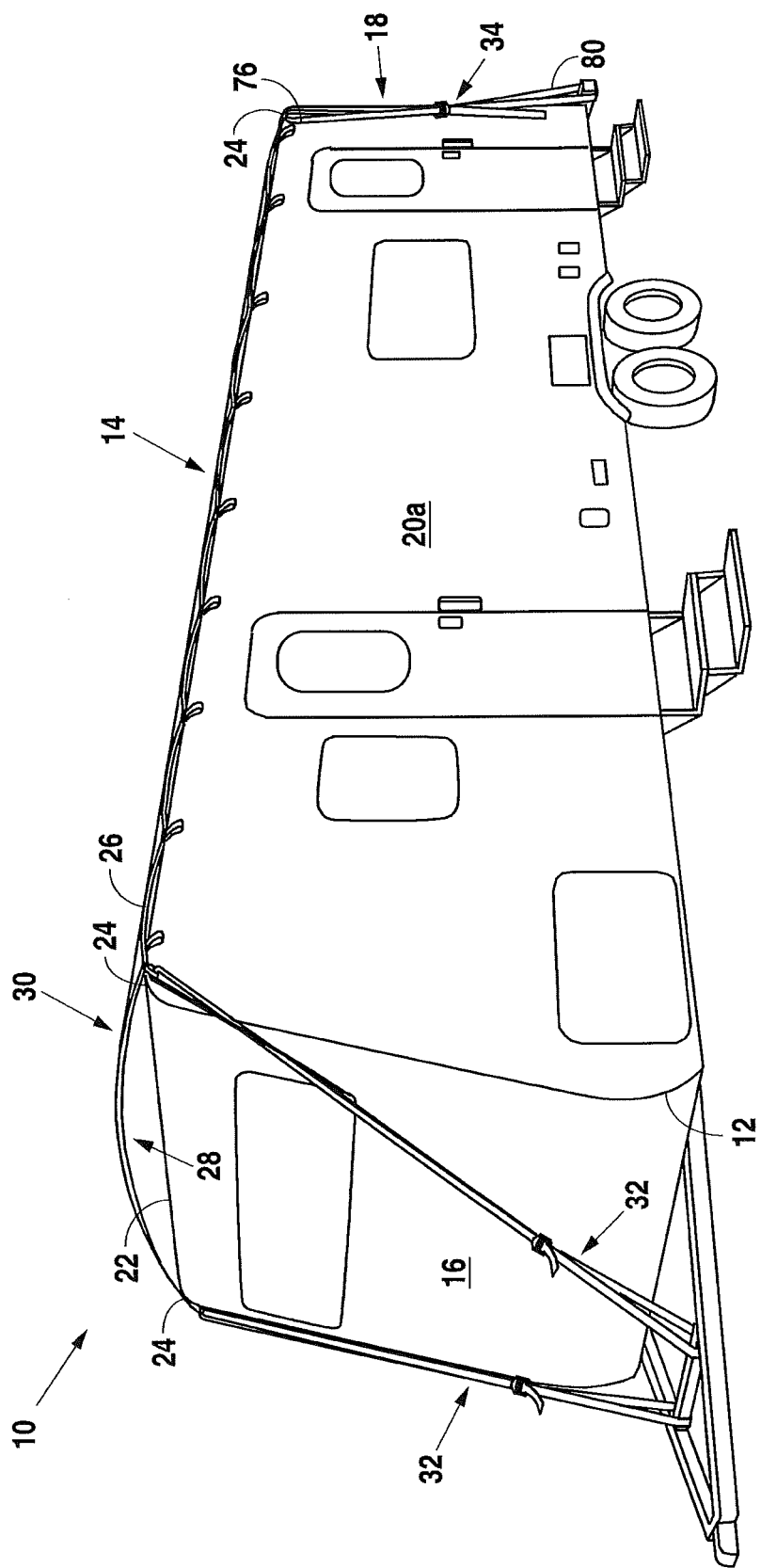
FIG. 1A is a perspective view of an alternative embodiment of the present invention secured to an RV.
Figure 10:
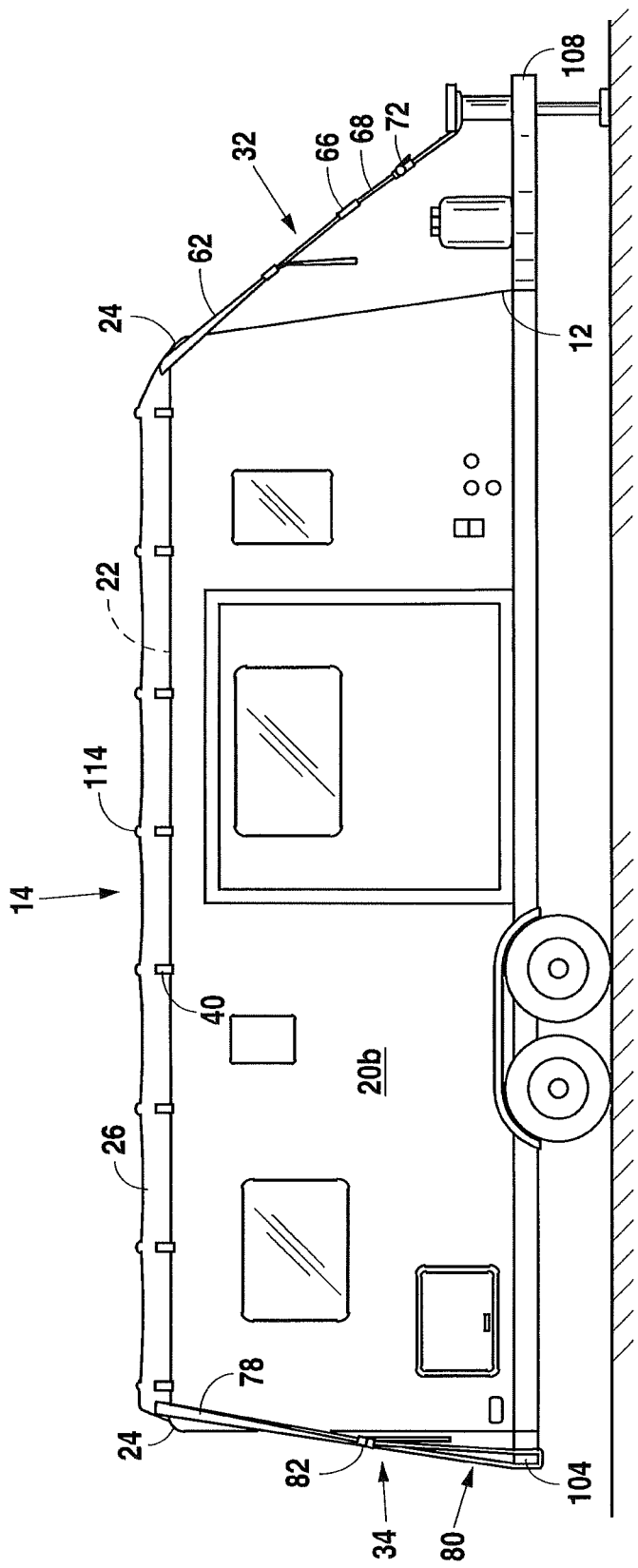
FIG. 10 is a side elevation view of the preferred embodiment of the present invention after installation is complete.

Referring to FIGS. 1 and 1A, the preferred embodiment (FIG. 1) and the alternative embodiment (FIG. 1A) of a recreational vehicle rooftop shade system 10 are shown. The system 10 generally comprises a trailer body 12 with a shade cover 14 secured to it. The trailer body 12 has a front end 16 and a rear end 18 opposite the front end 16. Opposing sides of the trailer body 12 extend between the front and rear ends 16, 18. A first side 20a of the opposing sides is shown in FIG. 1 while a second side 20b of the opposing sides is shown in FIGS. 10 and 10A.

Referring back to FIGS. 1 and 1A, the shade cover 14 extends over the roof 22 of the trailer body 12. The shade cover 14 has a sheet 26 in a generally curved shape which provides shade for the roof 22. The curved shape of the sheet 26 has a concave lower surface 28 that faces the roof 22 and a convex upper surface 30 opposite of the lower surface 28. The curved shape causes the sheet 26 to be elevated from the roof 22 of the trailer body 12, with the largest degree of elevation being at the apex of the concave lower surface 28. Due to the elevation, however, the shade cover 14 is at risk of being windblown from the roof 22 and, therefore, a first stability strap system 32 and a second stability strap system 34 are employed to secure the shade cover 14 to the trailer body 12. Preferably, the sheet 26 is made from a high-density polyethylene (HDPE) monofilament and tape shade fabric offering a UV block of up to 97 percent. However, it is anticipated that other types of fabric may be used which offer varying amounts of airflow and UV protection.

Figure 2:
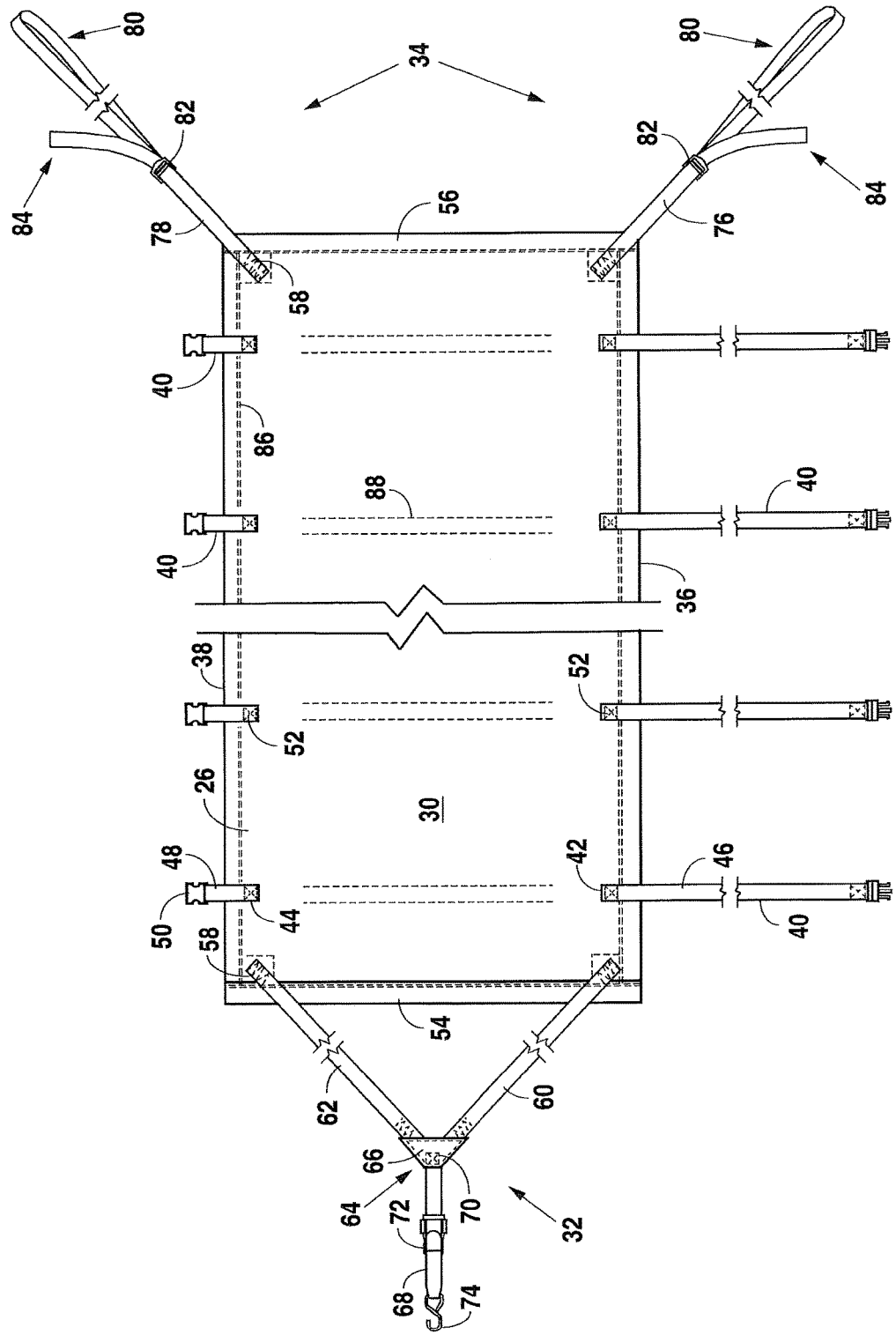
FIG. 2 is a top plan view of the preferred embodiment of the shade cover of the present invention.
Figure 3:
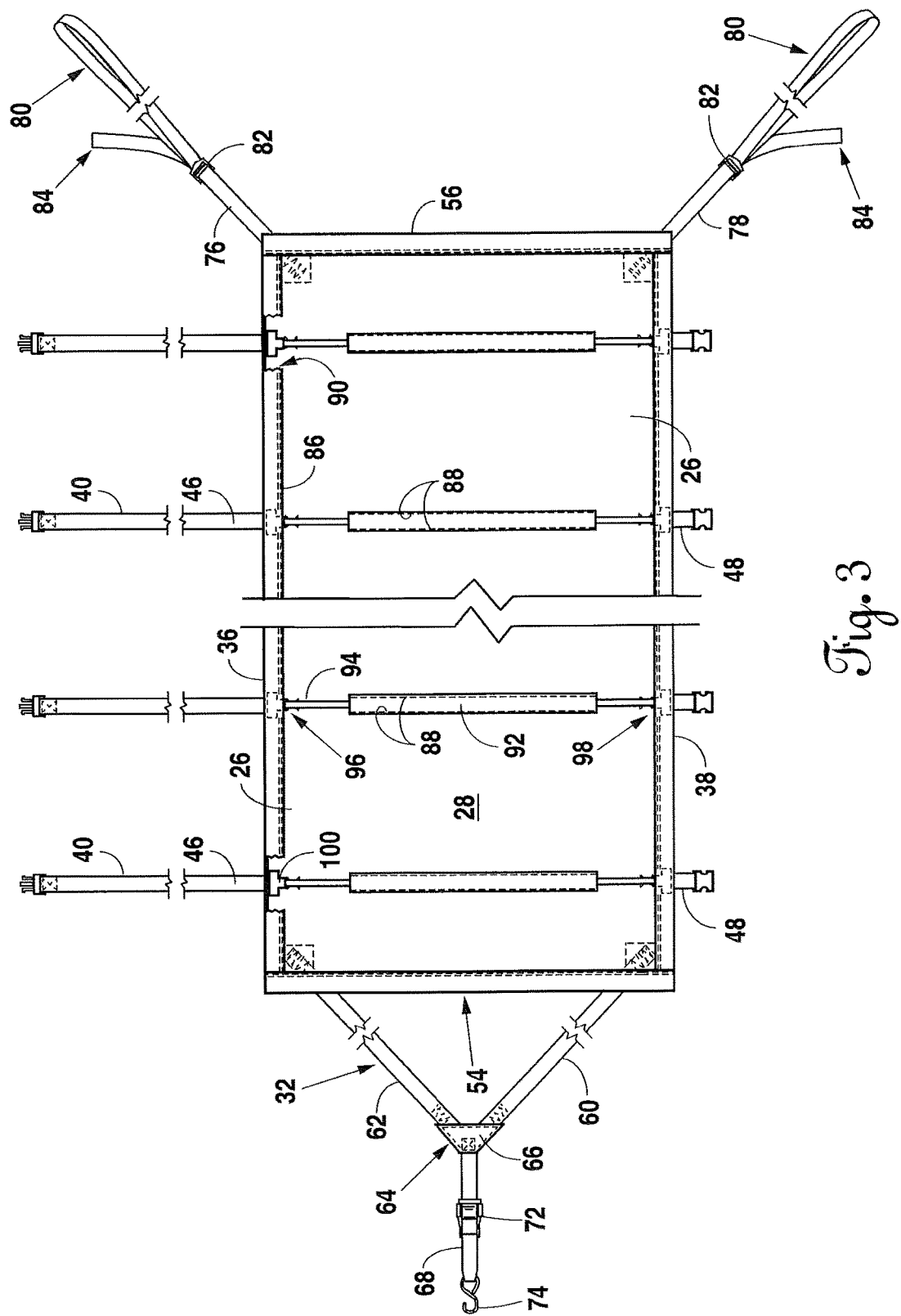
FIG. 3 is a bottom plan view of the preferred embodiment of the shade cover of the present invention.

In FIGS. 2 and 3, the sheet 26 of the preferred embodiment is shown in a top plan view and bottom plan view, respectively, however, the normally convex surface 30 is not convex because the sheet 26 is flattened in this view. The sheet 26 has a first side boundary 36 and a second side boundary 38 opposite each other. One or more straps 40 are attached to the sheet 26 at a first strap attachment location 42 and at a second strap attachment location 44. The first and second strap attachment locations 42, 44 are oriented on the sheet 26 so that the straps 40 extend in a generally lateral direction across the sheet 26. The first and second strap attachment locations 42, 44 may be on the upper surface 30 of the sheet 26 as shown in FIG. 2 or could be located elsewhere on the sheet 26. For example, one or both strap attachment locations 42, 44 may be at the first and second boundaries 36, 38 in alternative embodiments.

Still referring to the preferred embodiment of FIG. 2 and also in FIG. 3, each of the straps 40 preferably has a first length 46 extending over the first side boundary 36 and a second length 48 extending over the second side boundary 38. The second length 48 may have a buckle 50 or some other connecting means like a hook (e.g., snap hook, S-hook), carabineer, or any other structural member for connecting the first and second lengths 46, 48 to each other. The first and second lengths 46, 48 are sewn to the sheet 26 with a box stich 52 or other suitable stitching at the first and second strap attachment locations 42, 44, respectively. Alternatively, the first and second lengths 46, 48 may be secured to the sheet 26 in some other manner.

Still referring to the preferred embodiment in FIGS. 2 and 3, a front end 54 and a rear end 56 of the sheet 26 extend between its first and second side boundaries 36, 38. Although the sheet 26 is shown as a rectangle, with the front and rear ends 54, 56 and first and second side boundaries 36, 38 all being a straight edge, the sheet 26 may be shaped differently. Preferably, the width of the flattened sheet 26 is shaped similar to, though slightly larger than, the width of the roof 22 of the trailer body 12.

Referring to the preferred embodiment shown in FIGS. 1, 2, 3, 7, 9 and 10, the first and second stability strap systems 32, 34 are shown affixed to the upper surface 30 of the sheet 26 with stitching 58. Alternatively, one or both of the strap systems 32, 34 may be affixed to the lower surface 28 of the sheet 26. Preferably, the first stability strap system 32 has a first strap member 60 and a second strap member 62 each with one end affixed to the upper surface 30. The first and second strap members 60, 62 extend from the front end 54 of the sheet 26 and converge toward each other. The first and second strap members 60, 62 join at a vertex 64 and are sewn to a trapezoidal piece of material 66 for strength. Alternatively, a differently shaped piece of material may be used, or, the strap members 60, 62 may be directly affixed to each other.

Still referring to the preferred embodiment in FIGS. 1, 2, 3, 7, 9 and 10, extending from the vertex 64 is a trailer-tongue attachment strap 68. The trailer-tongue attachment strap 68 is affixed to the trapezoidal piece of material 66 with a box stitch 70 but other stitch patterns may be used. The trailer-tongue attachment strap 68 is preferably a ratchet-style strap with a ratchet 72 that allows for length adjustment as well as for tightening the shade cover 24 against the roof 22. Alternatively, other types of adjustable straps may be used or the first stability strap system 32 may be custom fit depending on the make and model of the RV. The trailer-tongue attachment strap 68 preferably terminates with an "S" hook 74 or other termination hardware.

Referring to the preferred embodiment shown in FIGS. 1, 7, 8 and 10, the second stability strap system 34 also has first and second strap members 76, 78 extending from the rear end 56 of the sheet 26, though more or less strap members may be present. The first and second strap members 76, 78 may be adjustable or may be custom fit depending on the make and model of the recreational vehicle. In the preferred embodiment, the first and second strap members 76, 78 are doubled back to create a loop 80 and inserted through a cinching buckle or strap adjuster 82. The length of the strap members 76, 78 can be shortened by pulling on an end 84 of the strap members 76, 78 and lengthened by canting the cinching buckle or strap adjuster 82 with respect to the strap members 76, 78. Alternatively, the first and second strap members 76, 78 of the second stability strap system 34 may be a ratchet-style strap.

Also shown in FIG. 2 is stitching 86 around the sheet 26 and stitching 88 in the interior of the sheet 26. The stitching 86, 88 is for elements appearing on the lower surface 28 of the sheet 26, which are shown in FIG. 3. Referring to FIG. 3, the sheet 26 is shown in a bottom plan view; however, the normally concave lower surface 28 is not concave because the sheet 26 is flattened in this view. At the first and second side boundaries 36, 38 and the front and rear ends 54, 56 of the sheet 26, the material is folded back on itself and stitched to form a reinforced edge of the sheet 26. The stitching 86 affixes the edges of the material and a pocket 90 is created around the sheet 26. The stitching 88 on the interior of the sheet 20 affixes sleeves 92 along the lower surface 28.

Figure 4:
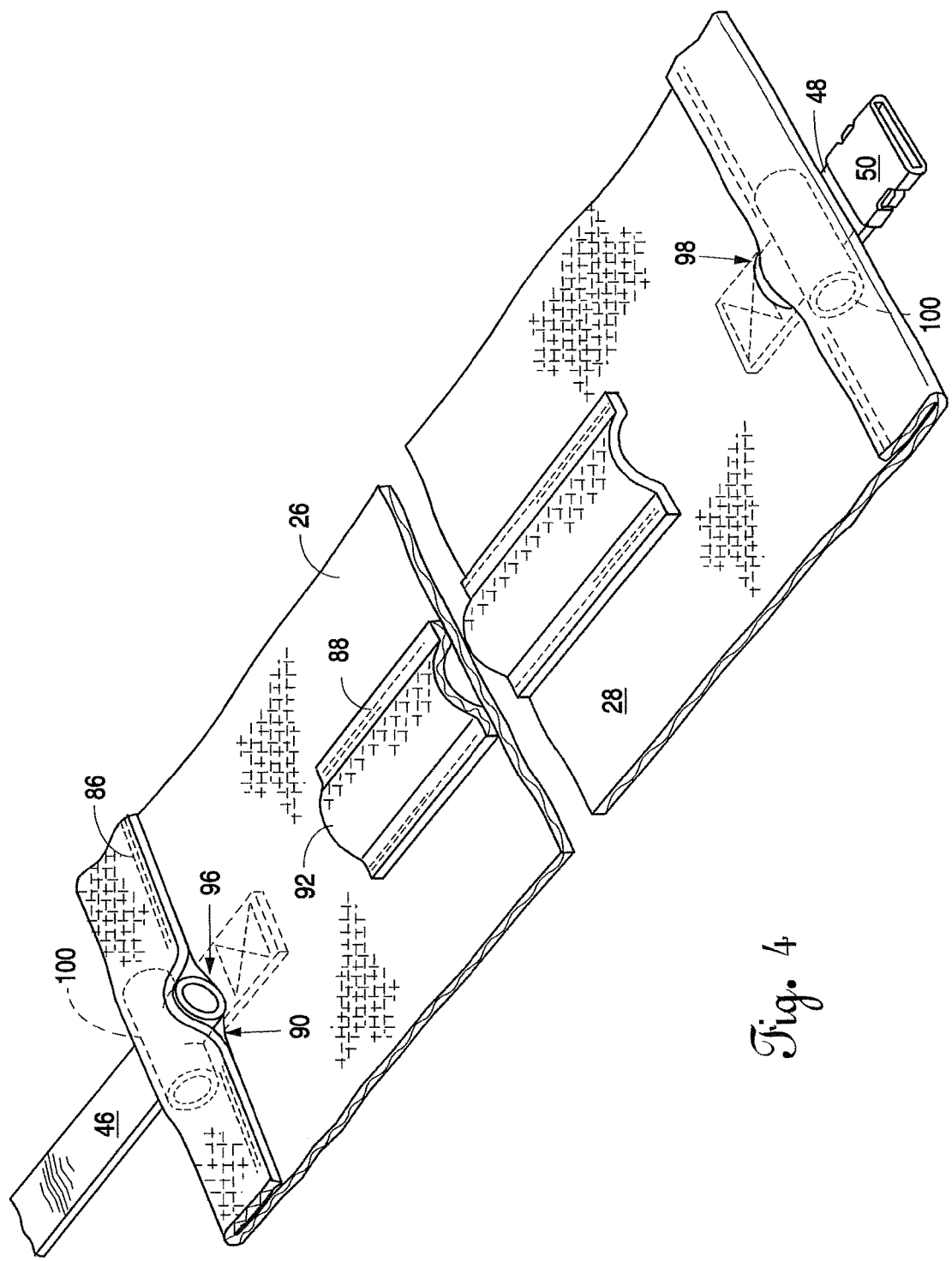
FIG. 4 is a partial section perspective view of the preferred embodiment showing a sleeve along the lower surface of the sheet between the first and second rod attachment locations.

Referring to the preferred embodiment shown in FIGS. 3, 4, 5 and 6, one or more support rods 94 are connected to the sheet 26 and extend between a first rod attachment location 96 and a second rod attachment location 98. The first and second rod attachment locations 96, 98 are located where the support rods 94 connect to the sheet 26. In the preferred embodiment, the first and second rod attachment locations 96, 98 are positioned at the first and second side boundaries 36, 38 of the sheet 26 where a T-shaped polyvinyl chloride (PVC) pipe connecting sleeves 100 are positioned within the pocket 90 as shown in FIG. 4. Alternatively, the connecting sleeves 100 may not be T-shaped, or, there may be alternative methods of attachment for the support rods 94. For example, the support rods 94 may be inserted into grommets or simply a reinforced pocket in the material (not shown).

Referring still to the preferred embodiment shown in FIGS. 3, 4, 5 and 6, the support rods 94 extend through the sleeves 92 and along the lower surface 28. The first and second rod attachment locations 96, 98 are positioned along the first and second side boundaries 36, 38 of the sheet 26. Alternatively, the first and second rod attachment locations 96, 98 may be elsewhere on the lower surface 28. Or, as an even further alternative, the first and second rod attachment locations 96, 98 may be on the upper surface 30, with the support rods 94 extending along the upper surface 30, possibly through sleeves 92 located on the upper surface 30 (not shown).

Figure 5A:
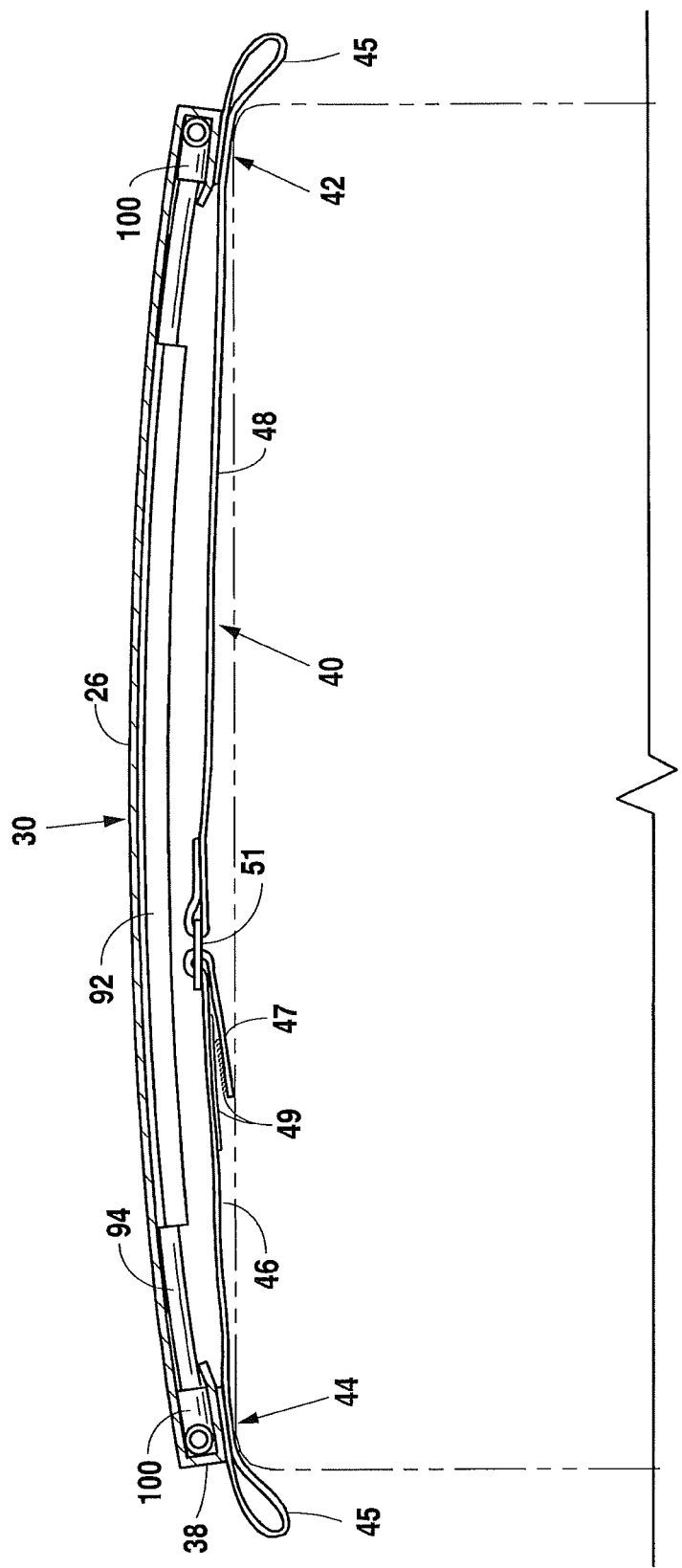
FIG. 5A is a cross-section side view of the alternative embodiment of the shade cover of the roof of the trailer body with the cinching strap slightly tightened.
Figure 6:
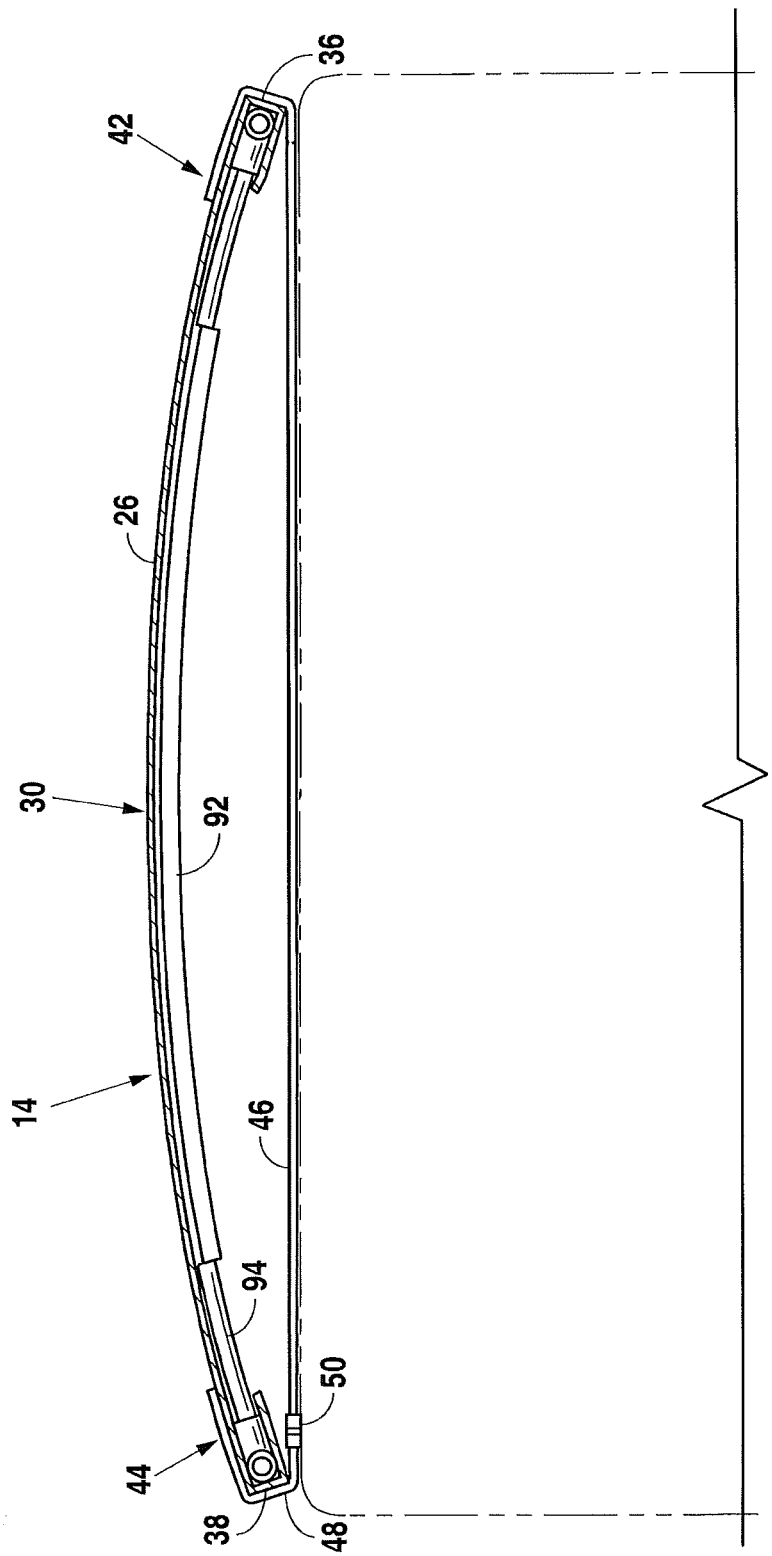
FIG. 6 is a cross-section side view of the preferred embodiment of the shade cover on the roof of the trailer body after connecting the straps.

Still referring to the preferred embodiment in FIGS. 5 and 6, when the first and second lengths 46, 48 of the straps 40 are connected and the shade cover 14 is installed, the support rods 94 maintain the curved shape of the sheet 26. The support rods 94 are preferably made from PVC pipe or a similarly resilient material. As shown in FIGS. 5 & 6, as the support rods 94 are bent into a curved shape, the sheet 26 follows the curvature of the support rods 94 and forms a curved sheet surface. When the first and second lengths 46, 48 of the straps 40 are connected with the buckle 50 the support rods 94 and the sheet 20 are then held in the curved shape. FIG. 5 shows the straps 40 prior to connecting the first and second lengths 46, 48. In this figure, the support rod 94 is slightly curved because the length of the support rod 94 is slightly greater than the width of the sheet 26 between the rod attachment locations 96, 98. Alternatively, the support rod 94 could be the same length as the width of the sheet 26 between the rod attachment locations 96, 98. In which case, the support rod 94 and surface of the sheet 26 would lay flat prior to connecting the first and second lengths 46, 48. FIG. 6 shows the straps 40 after the lengths 46, 48 are connected. The first and second lengths 46, 48 extend from the first and second strap attachment locations the convex surface 30 around the first and second side boundaries 36, 38 of the sheet 20.

Preferably, each of the straps 40 is linearly aligned with one of the support rods 94 as shown in FIG. 3 so that when the first and second lengths 46, 48 of the straps 40 are connected each of the straps 40 and its corresponding support rod are positioned in the same vertical plane. Alternatively, each of the straps 40 could be offset from its corresponding support rod; however, each of the straps 40 would still preferably extend in the same general direction as its corresponding support rod. As such, the curved shape is prevented from twisting when the first and second lengths 46, 48 are connected.

Figure 7:
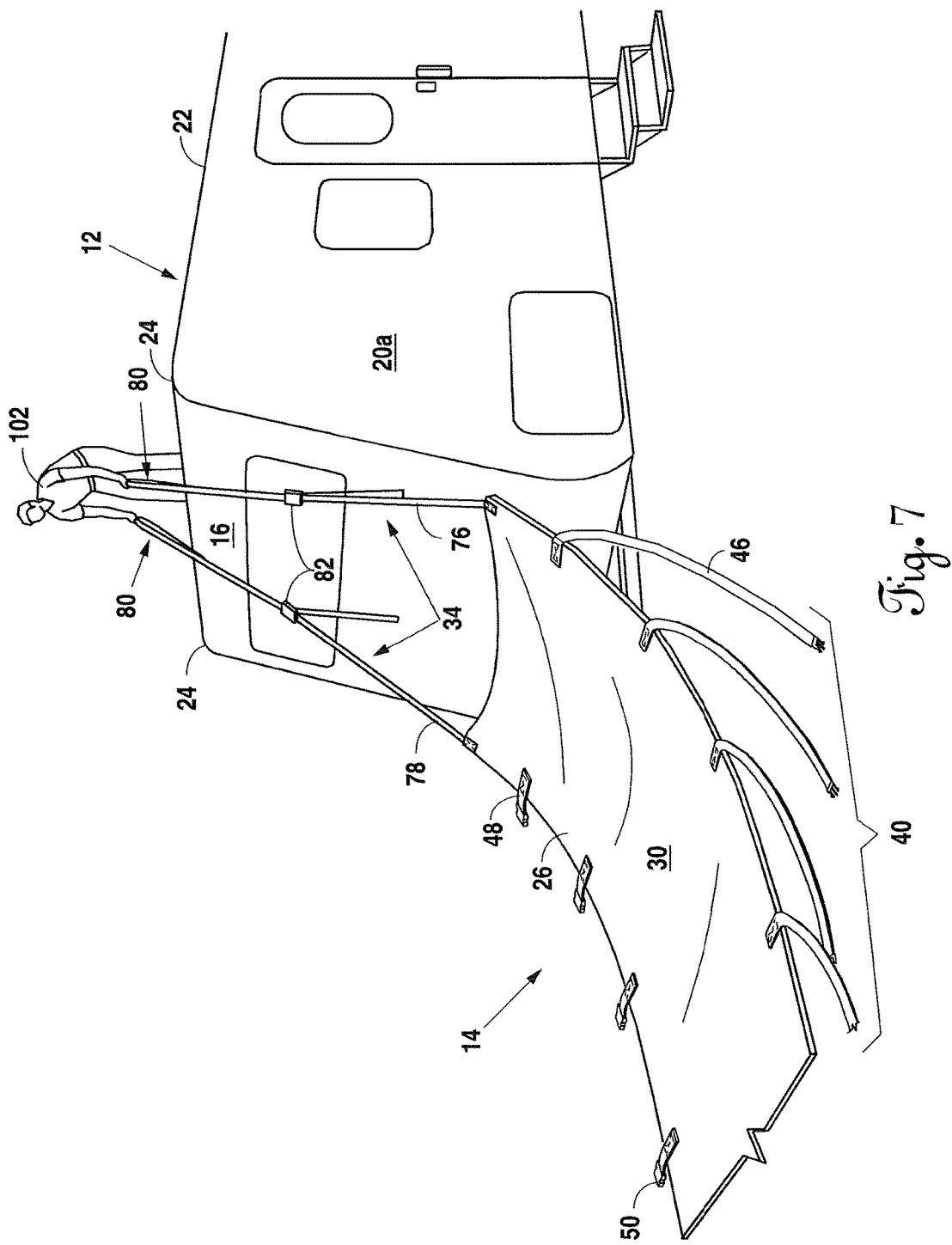
FIG. 7 is a perspective view of the preferred embodiment showing the shade cover being pulled over the front end of the trailer body during one state of installation.

FIG. 7 shows the shade cover of the preferred embodiment 14 being installed on the trailer body 12. A person 102 grabs the loops 80 on the first and second strap members 76, 78 of the second stability strap system 34 and pulls the sheet 26 onto the roof 22 from the front end 16 of the trailer body 12. The first and second lengths 46, 48 of each of the straps 40 are unconnected for this step. The person 102 pulls the shade cover 14 toward the rear end 18 of the trailer body 12 so that the sheet 26 covers the roof 22 as shown in FIG. 8.

Referring to the preferred embodiment shown in FIG. 8, the first length 46 of each of the straps 40 hangs from the sheet 26 and awaits connection with the second length 48. The first stability strap system 32 also hangs from the front end 54 of the sheet 26, while the second stability strap system 34 has been attached to a bumper 104 at the rear end 18 of the trailer body 12. In this regard, the loop 80 on the first strap member 76 of the second stability strap system 34 can be seen around the bumper 104 in FIG. 8 while the loop 80 on the second strap member 78 can be seen around the bumper 104 in FIG. 10. Once looped over the bumper 104, the lengths of the first and second strap members 76, 78 can be adjusted at the strap adjuster 82 for optimal positioning of the shade cover 14 on the roof 22.

To achieve optimal positioning of the preferred embodiment of the shade cover 14 on the roof 22, the first and second strap members 60, 62 of the first stability strap system 32 and the first and second strap members 76, 78 of the second stability strap system 34 are each positioned so that a portion of each strap 60, 62, 76, 78 extends around a corner 24 of the trailer body 12. In FIG. 8, the first strap member 60 of the first stability strap system 32 and the first strap member 76 of second stability strap system 34 are both shown extending around their respective corners 24. In FIG. 10, the second strap members 62, 78 of the first and second stability strap systems 32, 34 can both be seen extending around their respective corners 24. Once each of the strap members is retained around its respective corner 24, the first and second strap members 60, 62 of the first stability strap system 32 are shortened using strap adjusters 112. Shortening the strap members 60, 62 pulls corners of the front end 54 of the sheet 26 toward the roof 22 and prevents it from moving laterally across the roof 22.

With the shade cover 14 positioned as described with regard to FIGS. 8 and 10, the first and second lengths 46, 48 of the straps 40 are connected as shown and discussed with regard to FIGS. 5 and 6. To do this, the person 102 positions a ladder (not shown) at one of the first lengths 46 which hangs from the roof 22 as shown in FIG. 8. The person 102 lifts the sheet 20 and throws the first length 46 across the roof 22 toward the other side 20b of the trailer body 12 and moves the moves the ladder to the next first length 46. Once each first length 46 has been thrown to the other side 20b, the ladder is positioned on the other side 20b and the person 102 connects each first length 46 to its respective second length 48, thereby attaining curved shape of the sheet 26 as previously described.

Figure 9:
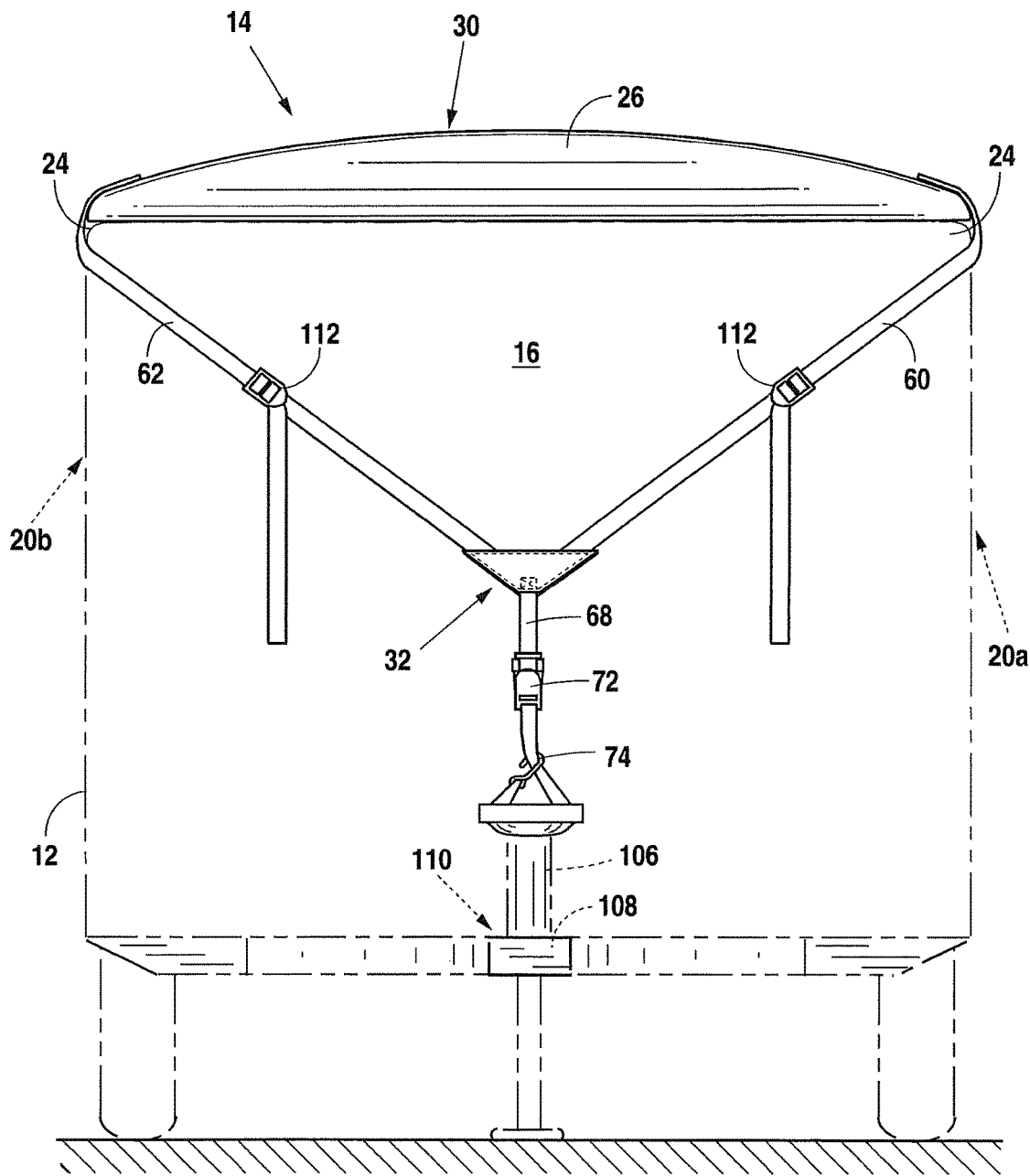
FIG. 9 is an end view of the preferred embodiment of the present invention during installation after connecting the first stability strap system to the trailer tongue at the front end of the trailer body.

Referring now to FIG. 9, the trailer-tongue attachment strap 68 is wrapped around a vertical portion 106 of a trailer tongue 108 with the S-hook 74 around the strap 68 while the sheet 20 is in the curved shape. Alternatively, the trailer tongue attachment strap 68 may be wrapped around a horizontal portion 110 of the trailer tongue 108, or, as an even further alternative, the S-hook 74 may be hooked into part of the trailer tongue 108 or otherwise secured to the trailer body 12. Once secured to the trailer body 12, the trailer-tongue attachment strap 68 is ratcheted down using the ratchet 72. Ratcheting down the trailer-tongue attachment strap 68 tightens the first stability strap system 32 and acts to secure the shade cover 14 toward the roof 22.

FIGS. 1, 8 and 10, depicts the shade cover 14 fully installed and secured to the roof 22 so that lateral and vertical movement of the shade cover 14 is prohibited. Each of the first and second stability strap systems 32, 34 extends are positioned and secured as previously described. Peaks 114 can be seen along the convex surface 30 where the support rods 94 are located under the sheet 26 and the ends to the straps 40 can be seen.

Figure 3A:
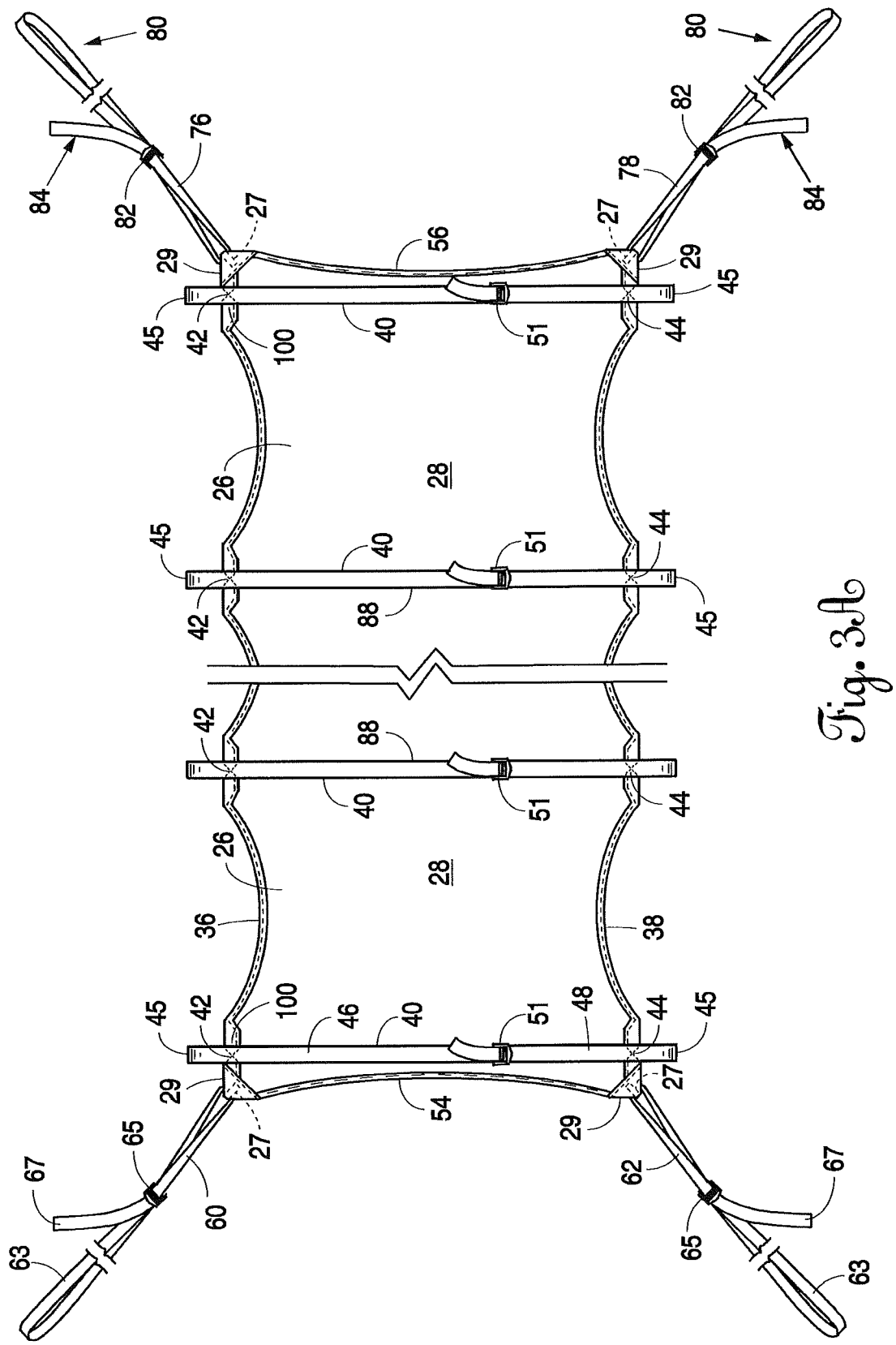
FIG. 3A is a bottom plan view of the alternative embodiment of the shade cover of the present invention.

Referring now to the alternative embodiment shown in FIGS. 2A and 3A, the sheet 26 is, once again, shown in a top plan view (FIG. 2A) and bottom plan view (FIG. 3A). The normally convex surface 30 is not convex because the sheet 26 is flattened in this view. The sheet 26 has a first side boundary 36 and a second side boundary 38 opposite each other. One or more straps 40 are attached to the sheet 26 at a first strap attachment location 42 and at a second strap attachment location 44. The first and second strap attachment locations 42, 44 are oriented on the sheet 26 so that the straps 40 extend in a generally lateral direction across the sheet 26 as shown in FIG. 3A. In this alternative embodiment, the first and second strap attachment locations 42, 44 are positioned on the lower surface 28 at the first and second side boundaries 36, 38 of the sheet 26 as shown in FIG. 3A.

Still referring to the alternative embodiment of FIGS. 2A and 3A, each of the straps 40 has a first length 46 sewn to the sheet 26 at the first attachment location 42 at the side boundary 36 and a second length 48 sewn to the sheet 26 at the second strap attachment location 44 at side boundary 38. Each of the first and second strap lengths 46, 48 are sewn to the sheet 26 with a box stitch or other suitable stitching. A portion of each strap length 46, 48 extends beyond the side boundaries 36, 38, respectively, and folds under on itself forming a loop 45. Each loop 45 extends beyond the side boundaries 36, 38. The second strap length 48 is connected to a cinching buckle 51. The first strap length 46 has a loose end 47 at one end which can be threaded through the cinching buckle 51 for tightening of the strap 40. Alternatively, each strap 40 may be a single length of material which is overlapped on itself.

Figure 8A:
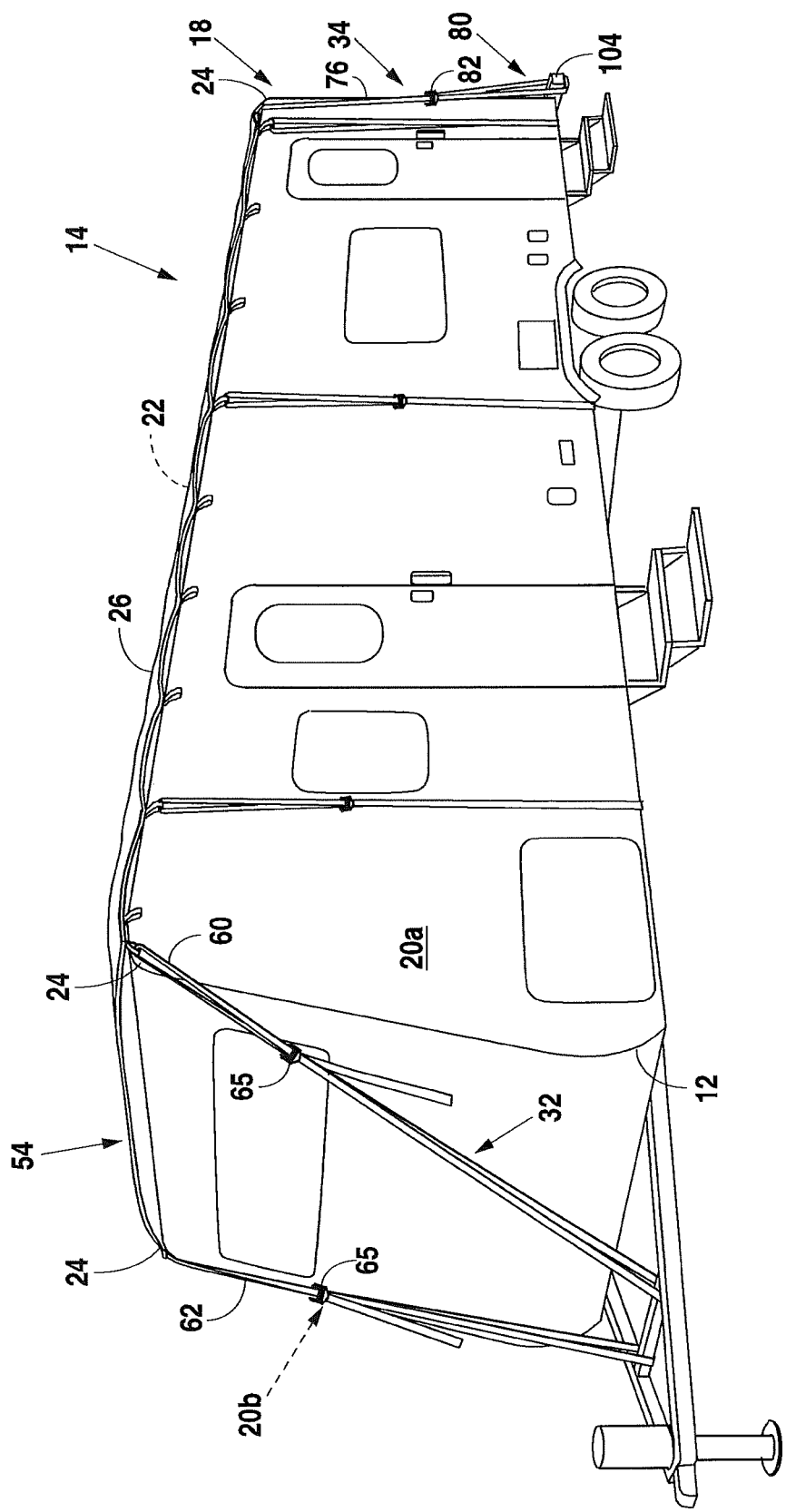
FIG. 8A is a perspective view of the alternative embodiment showing the cover on the roof of the trailer during the completion of installation.

Still referring to the alternative embodiment in FIGS. 2A and 3A, the front end 54 and a rear end 56 of the sheet 26 extend between its first and second side boundaries 36, 38. Although the sheet 26 in this alternative embodiment is still generally rectangular, the front and rear ends 54, 56 are scalloped or curved inwardly between the corners of the sheet 26. In addition, the first and second side boundaries 36, 38 are scalloped or curved inwardly between each of the first strap attachment locations 42 and between each of the second strap attachment locations 44. The scalloping of the front end and rear end 54, 56, and the first and second side boundaries 36, 38 of the sheet 26, allows the scalloped section of the front end and rear end 54, 56, and the first and second side boundaries 36, 38 to be raised from the roof 22 of the trailer body 12 when the sheet 26 is stretched tight over the top of the roof 22 as shown in FIGS. 1A, 8A and 10A. In this alternative embodiment, the sheet 26 is sized to generally cover the roof 22 of the trailer body 12.

Referring to the alternative embodiment shown in FIGS. 1A, 2A, 3A, 8A, and 10A, the first and second stability strap systems 32, 34 are shown affixed to the upper surface 30 of the sheet 26 by being tied through loops 27 positioned and stitched at the corners of the sheet 26. Alternatively, one or both of the strap systems 32, 34 may be affixed to the lower surface 28 of the sheet 26. The first stability strap system 32 has first and second strap members 60, 62 extending from the front end 54 of the sheet 26. In this alternative embodiment, the first and second strap members 60, 62 are adjustable in length with cinching buckles or strap adjusters 65. In this alternative embodiment, the first and second strap members 60, 62 are double-backed to create a loop 63. The length of the strap members 60, 62 can be shortened by pulling on a loose end 67 of the strap members 60, 62 or lengthened by canting the cinching buckles or strap adjuster 65 with respect to the strap members 60, 62. Alternatively, the first and second strap members 60, 62 of the first stability strap system 32 may be ratchet-style strap.

Still referring to the alternative embodiment shown in FIGS. 1A, 2A, 3A, 8A and 10A, the second stability strap system 34 also has first and second strap members 76, 78 extending from the rear end 56 of the sheet 26 though more or less strap members may be present. In this embodiment, the first and second strap members, 76, 78 are doubled back to create a loop 80 and inserted through a cinching buckle or strap adjuster 82. The length of the strap members 76, 78 can be shortened by pulling on a loose end 84 of the strap members 76, 78 and lengthened by canting the cinching buckle or strap adjuster 82 with respect to the strap members 76, 78. Alternatively, the first and second strap members 76, 78 of the second stability strap system 34 may be a ratchet-style strap.

Referring to the alternative embodiment shown in FIG. 3A, the sheet 26 is shown in a bottom plan view; however, the normally concave lower surface 28 is not concave because the sheet 26 is flattened in this view. At the first and second side boundaries 36, 38 and the front and rear ends 54, 56 of the sheet 26, the material is folded back on itself and stitched to form a reinforced edge of the sheet 26. The width of the material which is folded back is slightly wider at each of the first and second strap attachment locations 42, 44. A triangular layer 29 of reinforcing material is stitched to the lower surface 28 of the sheet 26 at each of the four corners of the sheet 26.

Figure 4A:
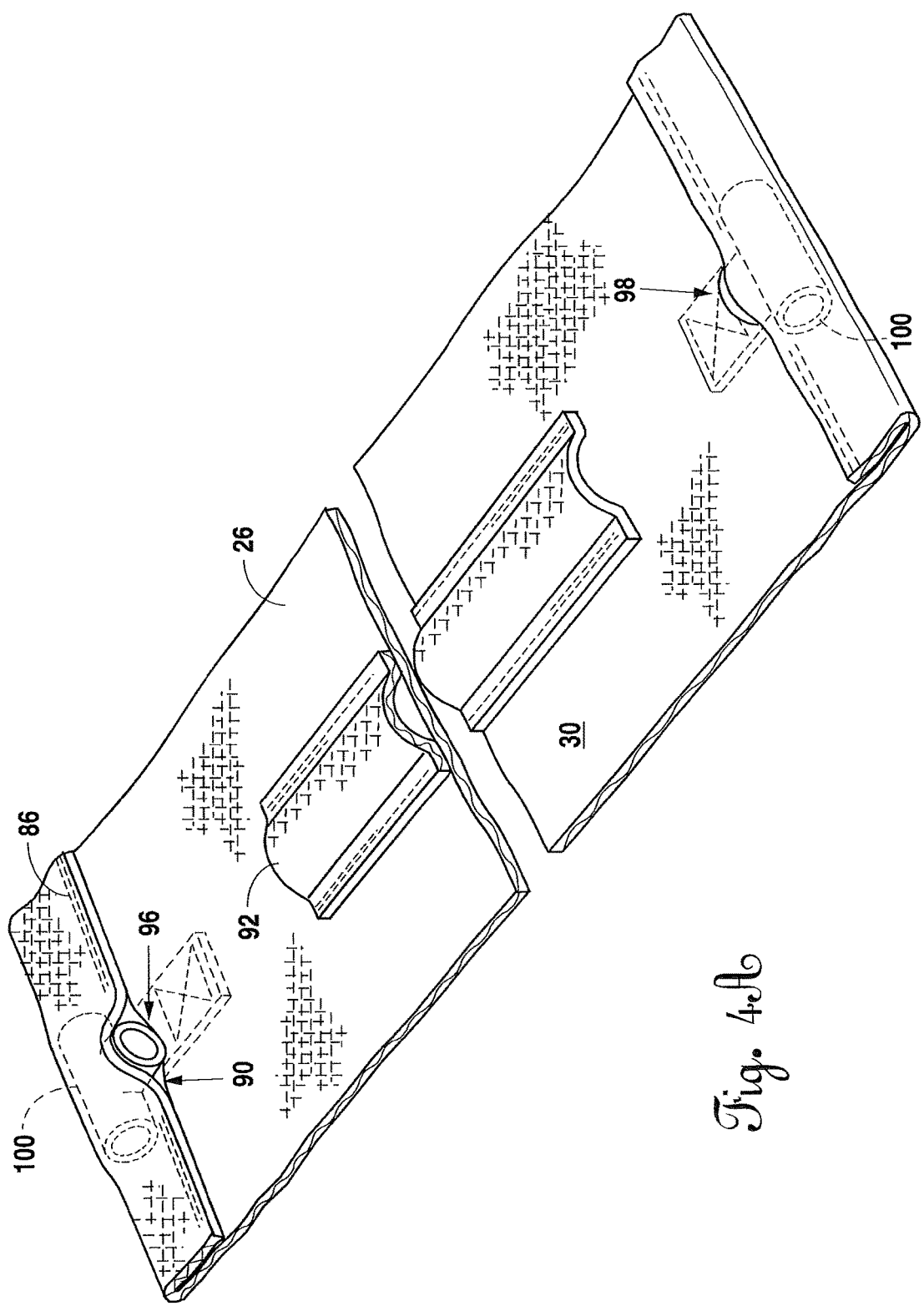
FIG. 4A is a partial section perspective view of the alternative embodiment showing a sleeve along the lower surface of the sheet between the first and second rod attachment locations.
Figure 4B:
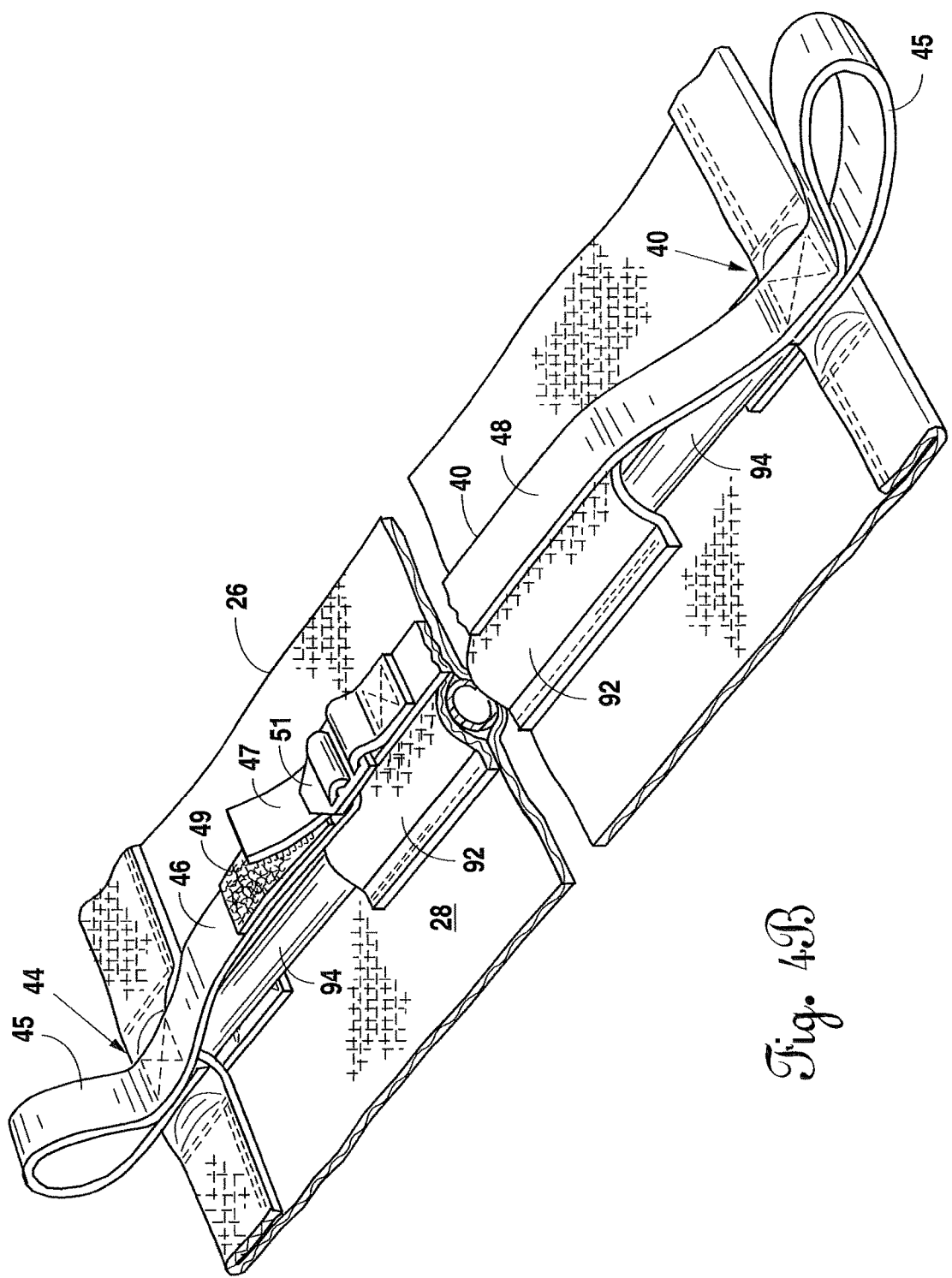
FIG. 4B is a partial section perspective view of the alternative embodiment showing the sleeve along the lower surface of the sheet between the first and second rod attachment locations and also showing a cinching strap and buckle.

Referring to the alternative embodiment shown in FIGS. 4A, 4B, 5A and 6A, one or more support rods 94 are connected to the sheet 26 and extend between a first rod attachment location 96 and a second rod attachment location 98. The first and second rod attachment locations 96, 98 are located where the support rods 94 attach to the sheet 26. In this alternative embodiment, the first and second rod attachment locations 96, 98 are positioned at the first and second side boundaries 36, 38 of the sheet 26 proximal to the strap attachment locations 42, 44. A pocket 90 is formed between the layers of material of the reinforced edge at the first and second boundaries 36, 38 at each rod attachment locations 96, 98 and T-shaped polyvinyl chloride (PVC) pipe connecting sleeves 100 are positioned within each pocket 90 as shown in FIGS. 4A and 4B. Alternatively, the connecting sleeves 100 may not be T-shaped, or, there may be alternative methods for attachment of the support rods 94. For example, the support rods 94 may be inserted into grommets or simply into a reinforced pocket in the material (not shown).

Referring still to the alternative embodiment shown in FIGS. 3A, 4A, 4B, 5A and 6A, each of the support rods 94 extend through the sleeves 92 which are positioned laterally and partially across the width of the lower surface 28 of the sheet 26 and into the connecting sleeves 100 positioned in the pockets 90 at each of the first and second rod attachment locations 96, 98. Alternatively, the first and second rod attachment locations 96, 98 may be positioned on the upper surface 30 of the sheet 26 with the support rods 94 extending through sleeves (not shown) positioned laterally and partially across the upper surface 30.

FIGS. 4B and 5A shows the alternative embodiment of the present invention with each support rod 94 positioned in the connecting sleeves 100 and through the sleeves 92 with the first and second lengths 46, 48 of the straps 40 connected with the loose end 47 of each of the first length 46 of the straps 40, threaded through the cinching buckles 51. In FIG. 5A, the straps 40 are shortened slightly to form curvature in the support rod 94. The sheet 26 follows the curvature of the support rods 94 and forms a curved sheet surface. FIG. 6A shows how the straps 40 are shortened further and thereby increasing the curvature of the support rods 94 and the surface of the sheet 26. Once the straps 40 are sufficiently shortened to the desired curvature of the support rod 94, the loose end 47 of each of the first lengths 46 of the straps 40 can be folded over on itself and attached thereto with hook and loop material 49 or some other means of attachment.

Still referring to the alternative embodiment shown in FIGS. 3A, 4A, 4B, 5A and 6A, each of the straps 40 is linearly aligned with a support rods 94 as shown in FIGS. 3A and 4B so that each of the straps 40 and its corresponding support rod are positioned in the same vertical plane. In that regard, the support rods are not shown in FIG. 3A because they are positioned underneath each of the straps 40. Alternatively, each of the straps 40 could be offset from its corresponding support rod; however, each of the straps 40 would still preferably extend in the same general direction as its corresponding support rod. As such, the curved shape is prevented from twisting when the first and second lengths 46, 48 of the straps 40 are connected.

Figure 7A:
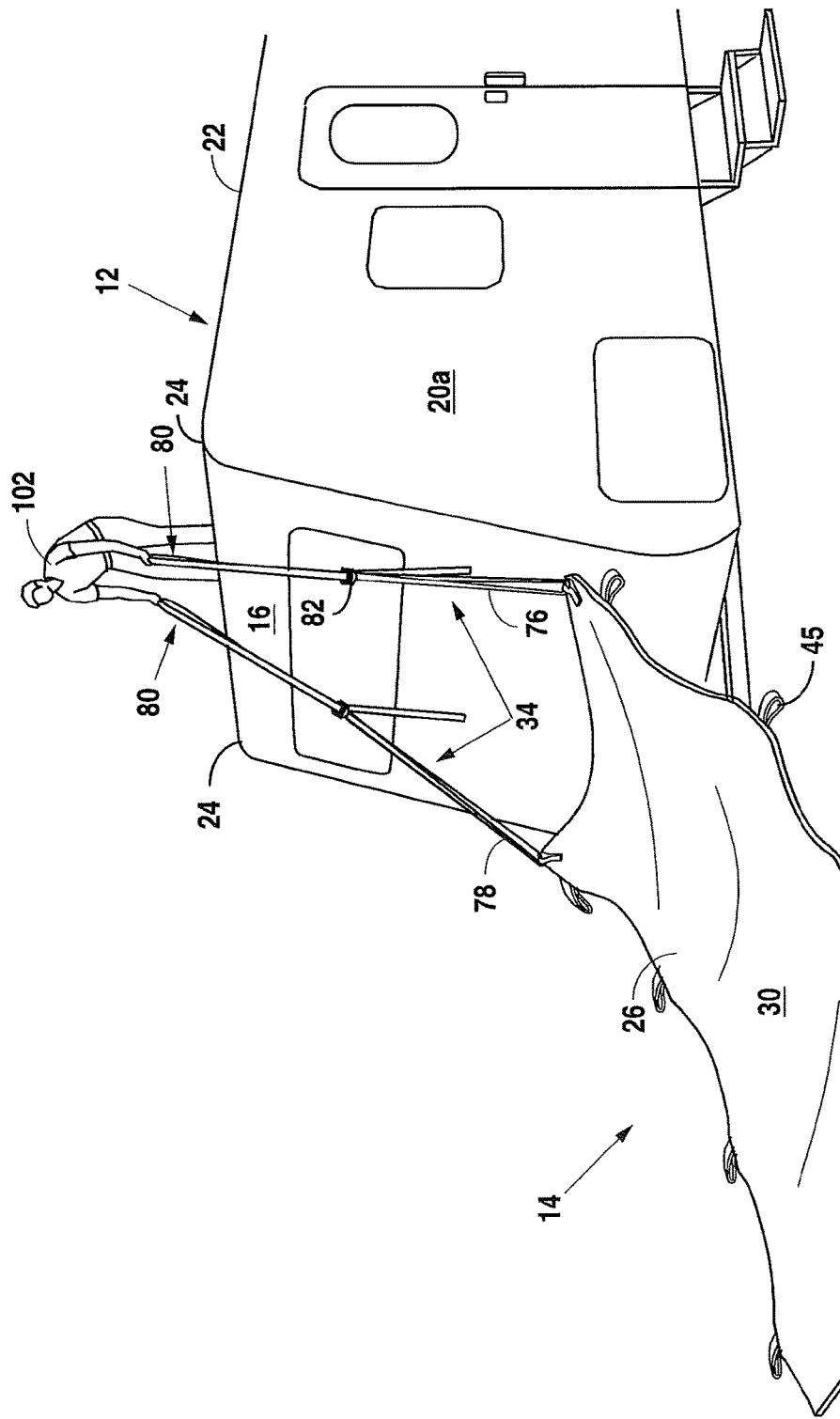
FIG. 7A is a perspective view of the alternative embodiment showing the cover being pulled over the front end of the trailer body during one state of installation.

FIG. 7A shows the alternative embodiment of the shade cover of the 14 being installed on the trailer body 12. A person 102 grabs the loops 80 of the first and second strap members 76, 78 of the second stability strap system 34 and pulls the sheet 26 onto the roof 22 from the front end 16 of the trailer body 12. The first and second lengths 46, 48 of each of the straps 40 may or may not be connected for this step. The person 102 pulls the shade cover 14 toward the rear end 18 of the trailer body 12 so that the sheet 26 covers the roof 22 as shown in FIG. 8A.

Referring to the alternative embodiment shown in FIGS. 8A and 10A, the sheet 26 has been pulled fully over the roof 22 of the trailer body 12. The straps 60, 62 of the first stability straps system 32 extend from the front end 54 of the sheet 26 and are looped around and connected to a cross member 110 of the trailer tongue 108 with loops 63. Similarly, the second stability strap system 34 is attached to a bumper 104 at the rear end 18 of the trailer body 12. In this regard, the loop 80 of the first strap member 76 of the second stability strap system 34 is shown around the bumper 104 in FIG. 8A while the loop 80 of the second strap member 78 can be seen in FIG. 10A. Once the first and second stability strap systems 32, 34 are in place, the lengths of the first and second strap members 60, 62, 76, 78 can be adjusted at the cinching buckles or strap adjusters 65, 82 for optimal positioning of the shade cover 14 on the roof 22.

To achieve optimal positioning of the alternative embodiment of the shade cover 14 on the roof 22, the first and second strap members 60, 62 of the first stability strap system 32 and the first and second strap members 76, 78 of the second stability strap system 34 are each positioned so that a portion of each strap 60, 62, 76, 78 extends around the outside edge of each corner 24 of the trailer body 12. In FIG. 8A, the first strap member 60 of the first stability strap system 32 and the first strap member 76 of second stability strap system 34 are both shown extending around their respective corners 24. In FIG. 10A, the second strap members 62, 78 of the first and second stability strap systems 32, 34 can both be seen extending around their respective corners 24. Once each of the strap members is retained around its respective corner 24, the first and second strap members 60, 62 of the first stability strap system 32 can be shortened using strap adjusters 65. Shortening the strap members 60, 62 pulls corners of the front end 54 of the sheet 26 toward the roof 22 and prevents it from moving laterally across the roof 22.

With the alternative embodiment of the shade cover 14 positioned as described with regard to FIGS. 8A and 10A, the first and second lengths 46, 48 of the straps 40 are connected as shown and discussed with regard to FIGS. 5A and 6A. To do this, the person 102 positions himself with a ladder (not shown) at each of the strap attachment locations. The loose end 47 of each of the first lengths 46 of the straps 40 are threaded through the cinching buckles 51 attached to each of the second lengths 48 of the straps 40. The person 102 can pull on the loose end 47 and tighten the strap 40 until the optimal curvature of each support rod [94] is obtained. In this manner, the optimal curved shape of the sheet 26, as previously described is also obtained.

FIGS. 1A, 8A and 10A of the alternative embodiment, depict the shade cover 14 fully installed and secured to the roof 22 so that lateral and vertical movement of the shade cover 14 is prohibited. Each of the first and second stability strap systems 32, 34 extends are positioned and secured as previously described. Peaks 114 can be seen along the convex surface 30 where the support rods 94 are located under the sheet 26 and the ends to the straps 40 can be seen. In addition, as shown in FIG. 8A, secondary straps 112 may be used to further secure the shade cover 14 to the roof 22. The secondary straps 112 are tied to the loops 45 which extend from the sheet 26 at each of the first and second strap attachment location 42, 44 and secured to the bottom of or underneath the trailer body 12 with a hook (not shown) or in some other matter known to those skilled in the art.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

The invention claimed is:

1. A recreational vehicle shade cover comprising:
   a sheet of flexible material having a surface that is generally curved with a convex upper surface and a concave lower surface opposite said convex upper surface;
   said sheet having a first side boundary extending between a first front corner and a first rear corner and a second side boundary extending between a second front corner and a second rear corner;
   a front end of the sheet extending between said first front corner and said second front corner and a rear end of the sheet extending between said first rear corner and said second rear corner of the sheet, said front end being opposite of said rear end;
   a plurality of support rods wherein each of said support rods extends from a first rod attachment location on said sheet to a second rod attachment location on said sheet, said support rods maintaining the curved shape of said sheet; and,
   a plurality of straps affixed to said sheet wherein each of said straps is attached at a first strap attachment location and a second strap attachment location and extending under said concave side of said sheet; wherein the first and second strap attachment locations are located on the convex surface of said sheet, and each strap is configured to extend from the respective first strap attachment location to the respective second strap attachment location below said sheet and above a trailer body of a recreational vehicle.

2. The recreational vehicle shade cover of claim 1 wherein each first strap extends around said first side boundary of said sheet.

3. The recreational vehicle shade cover of claim 2 wherein each strap extends around said second side boundary of said sheet.

4. The recreational vehicle shade cover of claim 1 wherein each strap and each support rod are positioned in the same vertical plane.

5. The recreational vehicle shade cover of claim 4 wherein each support rod is positioned adjacent the concave surface of the sheet.

6. The recreational vehicle shade cover of claim 1 wherein each support rod extends through a sleeve.

7. The recreational vehicle shade cover of claim 1 wherein the length of each strap is adjustable.

8. The recreational vehicle shade cover of claim 1 wherein each strap comprises:
   a first length and a second length;
   said first and second lengths being connectable.

9. The recreational vehicle shade cover of claim 8 wherein said first and second lengths of each strap are adjustable.

10. The recreational vehicle shade cover of claim 1 wherein each first rod attachment location is proximal to said first side boundary and each second rod attachment location is proximal to said second side boundary.

11. The recreational vehicle shade cover of claim 1 further comprising:
    a first stability strap system secured to said sheet and extending away from said front end of said sheet; and,
    a second stability strap system secured to said sheet and extending away from said rear end of said sheet.

12. The recreational vehicle shade cover of claim 1 further comprising a first connecting sleeve positioned at each first rod attachment location and a second connecting sleeve positioned at each second rod attachment location, and, wherein each support rod has a first end inserted into said first connecting sleeve and a second end inserted into said second connecting sleeve.

13. The recreational vehicle shade cover of claim 12 wherein each of said first and second connecting sleeves are T-shaped and each of said first and second ends of each support rod are inserted into a bisecting leg of each T-shaped sleeve.

14. The recreational vehicle shade cover of claim 1
    wherein said front end comprises an edge having a single inwardly curved scallop extending from a position adjacent the first front corner to a position adjacent the second front corner; and
    wherein said rear end comprises an edge having a single inwardly curved scallop extending from a position adjacent the first rear corner and a position adjacent the second rear corner.

15. The recreational vehicle shade cover of claim 1 wherein said first and second side boundaries have edges with a plurality of inwardly curved scallops between each of the first strap attachment locations and between each of the second strap attachment locations.

16. A recreational vehicle rooftop shade system comprising:
    a trailer body of a recreational vehicle having a front end, a rear end opposite of said front end, and opposing sides extending between said front end and said rear end, and a roof;
    a rear bumper extending from the rear end of said trailer body; and,
    a trailer tongue extending from the front end of said trailer body;
    a sheet of flexible material having a lower surface facing at least a portion of said roof of said trailer body and elevated from at least a portion of said roof;
    said sheet having a front end extending between a first front corner and a second front corner, a rear end extending between a first rear corner and a second rear corner, and opposing first and second side boundaries extending between said front end and said rear end;
    a plurality of support rods wherein each of said support rods extends along said sheet, said support rods maintaining the elevation of said lower surface from said roof; and
    a plurality of straps affixed to said sheet wherein each of said straps extends under said lower surface of said sheet between the first and second side boundaries and wherein each of said support rods attach to said sheet at first and second strap attachment locations; wherein the first and second strap attachment locations are located on an upper surface of said sheet, and each strap is configured to extend from the respective first strap attachment location to the respective second strap attachment location between the lower surface of said sheet and above said trailer body.

17. The recreational vehicle rooftop shade system of claim 16 further comprising:
   a first stability strap system attached proximal to said front end of said sheet and securing said sheet to said recreational vehicle; and,
   a second stability strap system attached proximal to said rear end of said sheet and securing said sheet to said recreational vehicle.

18. The recreational vehicle rooftop shade system of claim 17 wherein said first stability strap system further comprises first and second strap members each having an upper end attached proximal to the front end of said sheet.

19. The recreational vehicle rooftop shade system of claim 18 wherein said second stability strap system further comprises first and second strap members each having an upper end attached proximal to the rear end of said sheet and each having a lower end attached to said rear bumper.

20. The recreational vehicle rooftop shade system of claim 19 wherein at least one of the strap members of the first and second stability strap systems are adjustable.

21. The recreational vehicle rooftop shade system of claim 16 wherein said first side boundary of said sheet is positioned adjacent the intersection of said roof and one of the opposing sides of said trailer body and said second side boundary of said sheet is positioned adjacent the intersection of said roof and the other of the opposing sides of said trailer body.

22. The recreational vehicle rooftop shade system of claim 21 wherein the length from the front end to the rear end of said sheet is approximately the length of the roof of the trailer body from the front end to the rear end.

23. The recreational vehicle rooftop shade system of claim 16 wherein said sheet is in a generally curved shape and each support rod maintains the curved shape of the sheet.

24. The recreational vehicle rooftop shade system of claim 23 wherein each strap and each support rod are positioned in the same vertical plane.

25. The recreational vehicle rooftop shade system of claim 16 wherein said front end and said rear end of said sheet each have an edge having inwardly curved scallop between the respective corners of the front end and rear end.

26. The recreational vehicle rooftop shade system of claim 16 wherein said first and second side boundaries have edges with a plurality of inwardly curved scallops between each of the first strap attachment locations and between each of the second strap attachment locations.

\* \* \* \* \*